(12) United States Patent
Ohno

(10) Patent No.: US 8,207,994 B2
(45) Date of Patent: Jun. 26, 2012

(54) LIGHT-EMITTING DEVICE, EXPOSURE DEVICE, IMAGE FORMING APPARATUS AND SIGNAL SUPPLY METHOD

(75) Inventor: Seiji Ohno, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 428 days.

(21) Appl. No.: 12/542,738

(22) Filed: Aug. 18, 2009

(65) Prior Publication Data

US 2010/0225727 A1    Sep. 9, 2010

(30) Foreign Application Priority Data

Mar. 6, 2009    (JP) ................. 2009-052963

(51) Int. Cl.
*B41J 2/45* (2006.01)
(52) U.S. Cl. .................................. 347/238
(58) Field of Classification Search .......... 347/130–132, 347/234–238, 246–250
See application file for complete search history.

(56) References Cited

U.S. PATENT DOCUMENTS

| | | | |
|---|---|---|---|
| 6,958,763 B2 | 10/2005 | Uemura | |
| 7,286,259 B2 * | 10/2007 | Ohno et al. | 358/1.8 |
| 7,675,531 B2 | 3/2010 | Mikami et al. | |
| 2004/0067085 A1 | 4/2004 | Uemura | |
| 2007/0070166 A1 | 3/2007 | Mikami et al. | |

FOREIGN PATENT DOCUMENTS

| | | |
|---|---|---|
| JP | 03-207685 | 9/1991 |
| JP | 11-105344 | 4/1999 |
| JP | 3298497 | 7/2002 |
| JP | 2004-122561 | 4/2004 |
| JP | 2005-096364 | 4/2005 |
| JP | 2005-271242 | 10/2005 |
| JP | 2006-076148 | 3/2006 |
| JP | 2007-086638 | 4/2007 |
| JP | 2008-023935 | 2/2008 |
| JP | 2008-241757 | 10/2008 |

* cited by examiner

*Primary Examiner* — Hai C Pham
(74) *Attorney, Agent, or Firm* — Fildes & Outland, P.C.

(57) ABSTRACT

The light-emitting device includes: light-emitting elements linearly arrayed at intervals corresponding to a first resolution; switch elements electrically connected to the light-emitting elements; a transfer signal supply unit supplying a transfer signal for transmitting an on state among the switch elements by alternately repeating operations of turning on one switch element and turning on two adjacent switch elements including the one switch element; and a light-emission signal supply unit supplying a light-emission signal corresponding to a second resolution being a half of the first resolution, at supply timing changed according to whether in a first mode for causing an odd-numbered light-emitting element and a next even-numbered one to emit light as a pair, or the second mode for causing an even-numbered light-emitting element and a next odd-numbered one to emit light as a pair, the light-emitting elements arrayed at positions corresponding to the numbers.

10 Claims, 17 Drawing Sheets

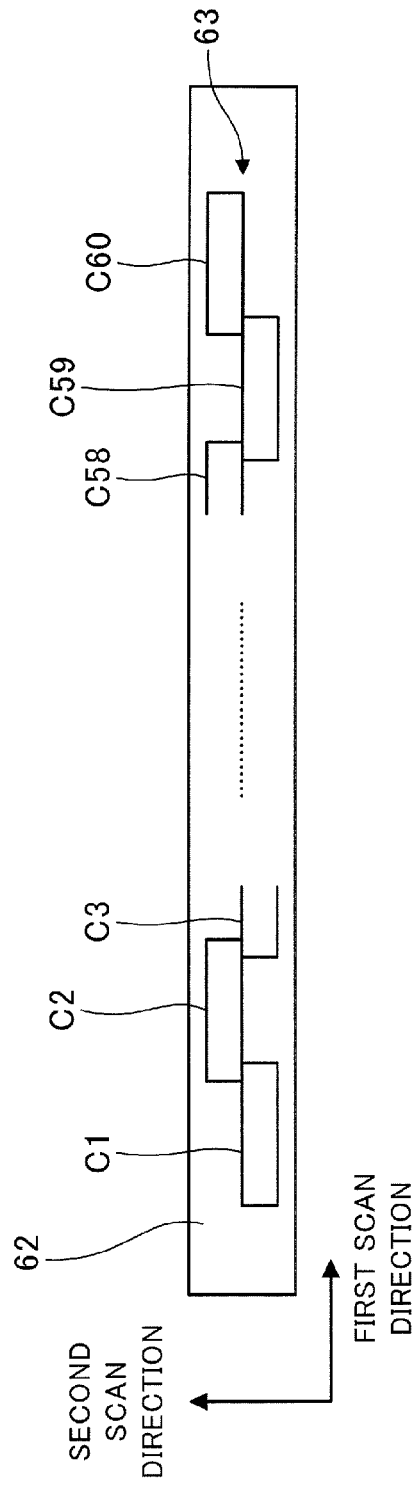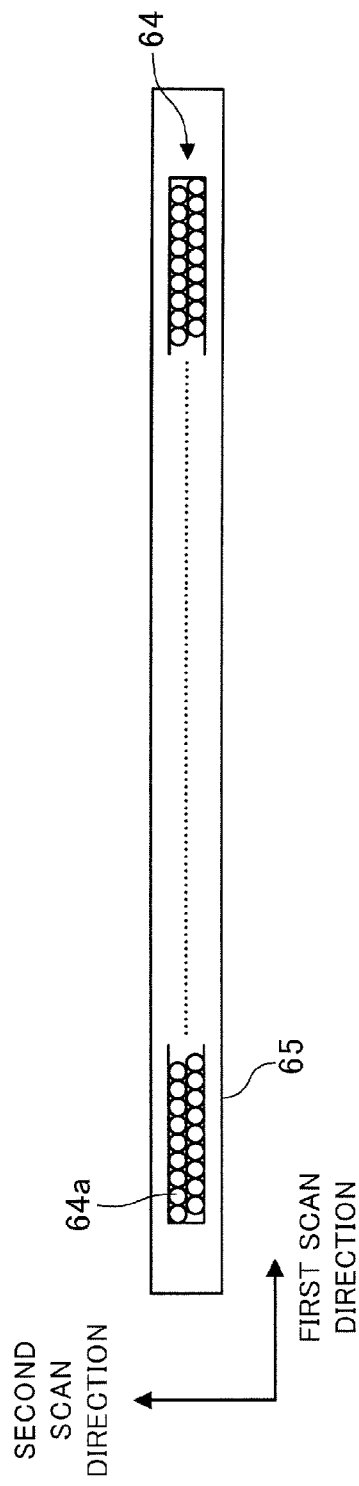
FIG.3A
FIG.3B

FIG.9

| COLOR | POSITION CORRECTION DATA SET R |
|---|---|
| YELLOW | 0 |
| MAGENTA | −1 |
| CYAN | −2 |
| BLACK | +1 |

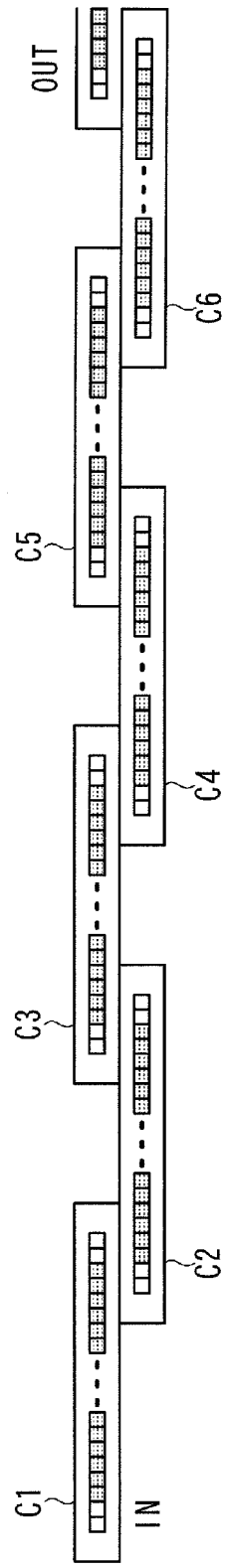
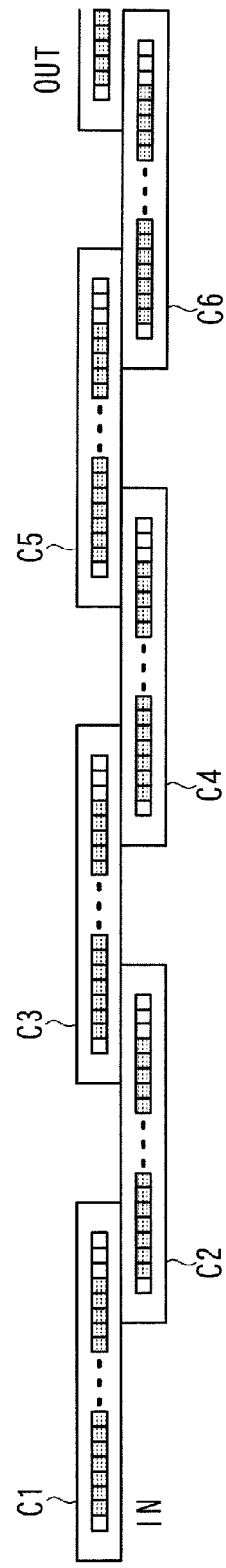
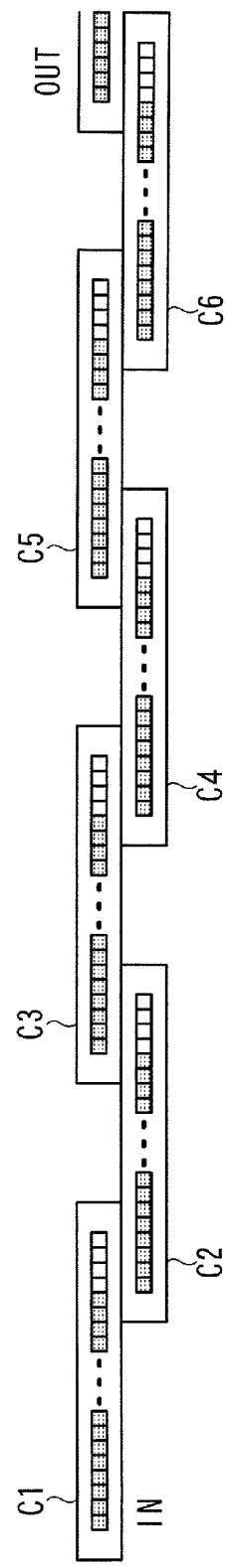
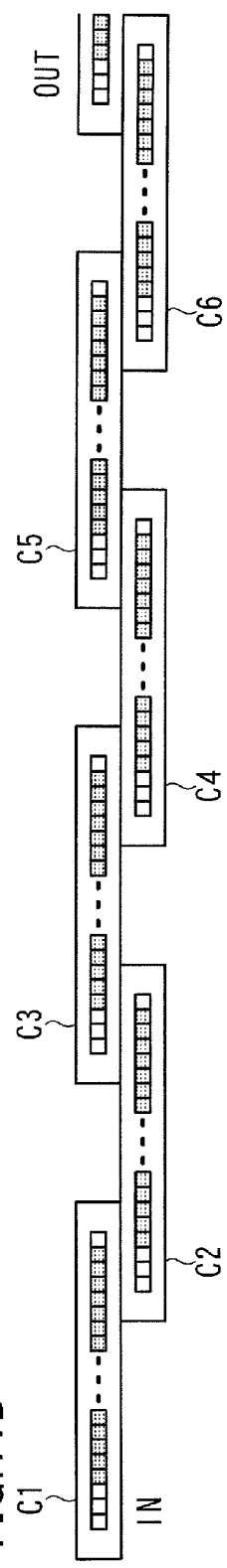
FIG.11A  Y : R = 0
FIG.11B  M : R = −1
FIG.11C  C : R = −2
FIG.11D  K : R = +1

FIG.13

| PERIOD | FIRST TRANSFER SIGNAL $\phi 1$ | FIRST TRANSFER SIGNAL $\phi 2$ |
|---|---|---|
| T a | H → L | L → L |
| T b | L → L | L → H |
| T c | L → L | H → L |
| T d | L → L | L → H |
| T e | L → L | H → L |
| T f | L → H | L → L |
| T g | H → L | L → L |
| T h | L → H | L → L |

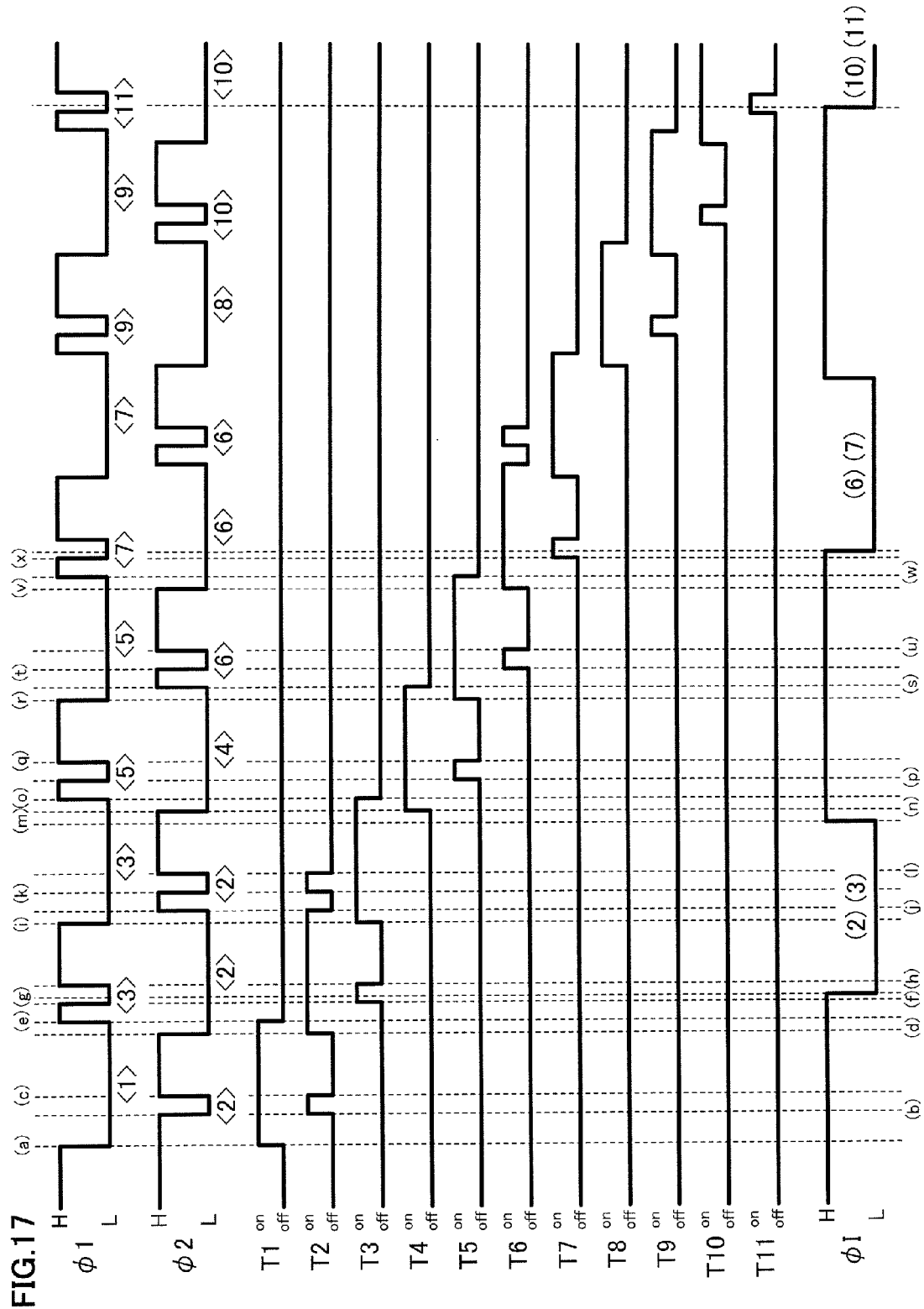

LIGHT-EMITTING DEVICE, EXPOSURE DEVICE, IMAGE FORMING APPARATUS AND SIGNAL SUPPLY METHOD

CROSS REFERENCE TO RELATED APPLICATIONS

This application is based on and claims priority under 35 USC §119 from Japanese Patent Application No. 2009-52963 filed Mar. 6, 2009.

BACKGROUND

1. Technical Field

The present invention relates to a light-emitting device including plural light-emitting elements, an exposure device, image forming apparatus, and a signal supply method.

2. Related Art

Recently, the following type of an exposure device that exposes the surface of an image carrier such as a photoconductor drum has been employed in an electrophotographic image forming apparatus such as a printer or a copy machine. The exposure device includes a light-emitting element array having light-emitting elements, such as light emitting diodes (LEDs), arrayed in a line. In addition, as a rapidly-increasing number of image forming apparatuses nowadays have color reproduction capabilities, an image forming apparatus capable of outputting multi-color images by using multiple image forming parts has been put into practical use. In such an image forming apparatus, the multiple image forming parts each including an exposure device are arranged in a line.

SUMMARY

According to an aspect of the present invention, there is provided a light-emitting device including: plural light-emitting elements that are arrayed in a line at intervals corresponding to a first resolution; plural switch elements that are electrically connected respectively to the plural light-emitting elements, and that each set one of the light-emitting elements which is connected thereto to be more ready to emit light when each of the switch elements is set to be in an on state as compared to when each of the switch elements is set to be in an off state; a transfer signal supply unit that supplies a transfer signal for transmitting an on state among the plural switch elements by alternately repeating an operation of turning on one switch element in the plural switch elements, and an operation of turning on two adjacent switch elements in the plural switch elements, the two adjacent switch elements including the one switch element; and a light-emission signal supply unit that supplies a light-emission signal corresponding to a second resolution being a half of the first resolution, at supply timing changed according to whether in a first mode or in a second mode, the first mode being a mode in which an odd-numbered light-emitting element and an even-numbered light-emitting element downstream from and adjacent to the odd-numbered light-emitting element are caused to emit light as a pair, the second mode being a mode in which an even-numbered light-emitting element and an odd-numbered light-emitting element downstream from and adjacent to the even-numbered light-emitting element are caused to emit light as a pair, each odd-numbered light-emitting element being one of the light-emitting elements arrayed at a position corresponding to an odd-number thereof, each even-numbered light-emitting element being one of the light-emitting elements arrayed at a position corresponding to an even-number thereof.

BRIEF DESCRIPTION OF THE DRAWINGS

Exemplary embodiment(s) of the present invention will be described in detail based on the following figures, wherein:

FIG. 3A is a top view of the circuit board and the light-emitting unit of each LPH, while FIG. 3B is a top view of the rod lens array and the holder of the LPH;

FIG. 9 is a table for illustrating relationships between respective colors and position correction data sets which are stored in the position correction data memories provided in the respective LPHs;

FIGS. 11A to 11D show luminous points of the light-emitting chips in the LPHs;

FIG. 13 illustrates the states of the first and second transfer signals in the periods;

FIG. 17 is a timing chart for illustrating the operation of the light-emitting chip in the even-odd mode as even-odd alternate light-emitting operation.

DETAILED DESCRIPTION

Hereinafter, a detailed description will be given of an exemplary embodiment of the present invention with reference to the accompanying drawings.

Figure 1:
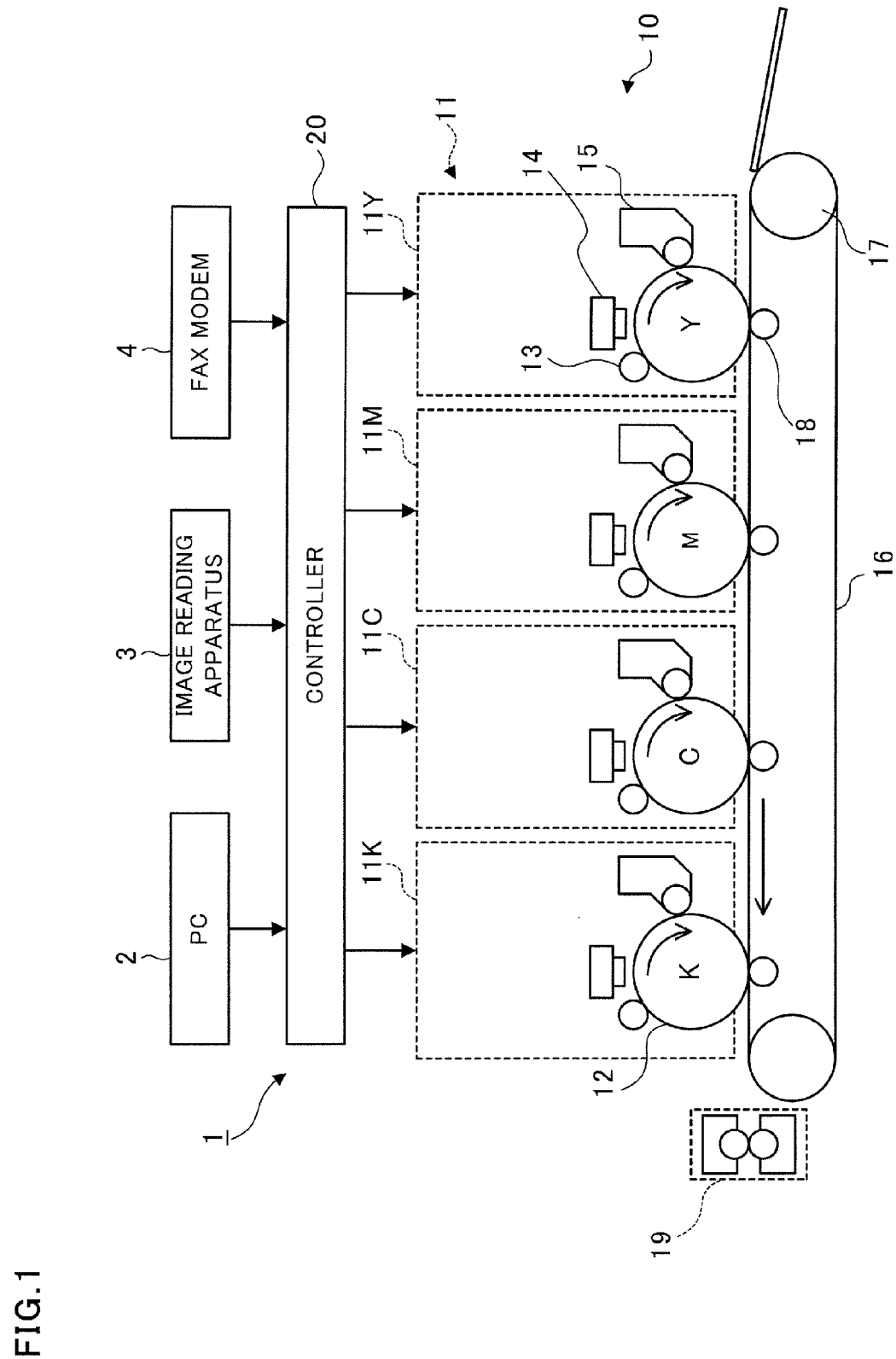
FIG. 1 shows an example of an overall configuration of an image forming apparatus to which the exemplary embodiment is applied.

FIG. 1 shows an example of an overall configuration of an image forming apparatus 1 to which the exemplary embodiment is applied. The image forming apparatus 1 is what is termed as a tandem image forming apparatus, and includes an image formation processing unit 10 and a controller 20. The image formation processing unit 10 forms images respectively corresponding to different color image data sets. The controller 20, which is connected to a device such as a personal computer (PC) 2, an image reading apparatus 3 or a facsimile (FAX) modem 4, performs image processing on image data received from the above device and controls operation of the entire image forming apparatus 1.

The image formation processing unit 10 includes four image forming units 11 (11Y, 11M, 11C and 11K, specifically) as an example of a plurality of image forming parts. Each image forming unit 11 includes a photoconductor drum 12, a charging device 13, a LED print head (LPH) 14 and a developing device 15. The photoconductor drum 12 is an example of an image carrier. The charging device 13 as an example of a charging device charges the photoconductor drum 12. The LPH 14 as an example of an exposure device exposes the charged photoconductor drum 12 in accordance with the image data set transmitted from the controller 20. The developing device 15 as an example of a developing device develops an electrostatic latent image formed on the photoconductor drum 12 with toner. In addition, the image formation processing unit 10 further includes a transport belt 16, a drive roll 17, transfer rolls 18 and a fixing device 19. The transport belt 16 transports a sheet on which color toner images respectively formed on the photoconductor drums 12 of the image forming units 11 are to be transferred by multi-layer transfer. The drive roll 17 drives the transport belt 16. Each transfer roll 18 as an example of a transfer device transfers a toner image formed on the corresponding photoconductor drum 12 onto a sheet. The fixing device 19 heats and presses to fix a toner image transferred but unfixed on a sheet.

Figure 2:
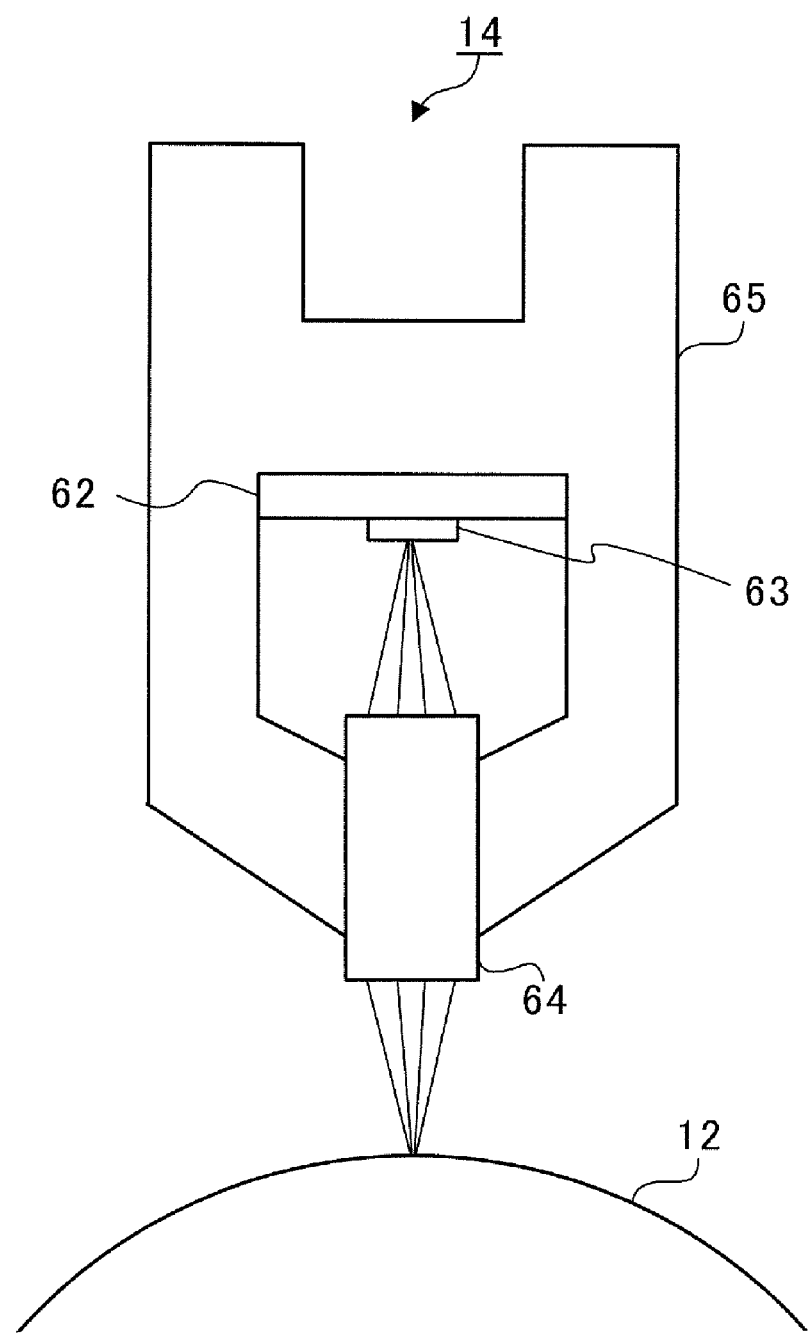
FIG. 2 is a cross-sectional view of a structure of the LPH.

FIG. 2 is a cross-sectional view of a structure of the LPH 14. The LPH 14 includes a light-emitting unit 63, a circuit board 62, a rod lens array 64 and a holder 65. The light-emitting unit 63 includes multiple LEDs. On the circuit board 62, mounted are the light-emitting unit 63, a signal generating circuit 100 (see FIG. 5 to be described later) that drives the light-emitting unit 63, and the like. The rod lens array 64 as an example of an optical member focuses light emitted by the light-emitting unit 63 onto the surface of the photoconductor drum 12. The holder 65 supports the circuit board 62 and the rod lens array 64 and shields the light-emitting unit 63 from the outside.

FIG. 3A is a top view of the circuit board 62 and the light-emitting unit 63 of each LPH 14, while FIG. 3B is a top view of the rod lens array 64 and the holder 65 of the LPH 14. As shown in FIG. 3A, the light-emitting unit 63 includes 60 light-emitting chips C (C1 to C60) zigzag arrayed on the circuit board 62 in two lines in a second scan direction. Here, 60 light-emitting chips C are an example of a plurality of light-emitting element chips, while the circuit board 62 is an example of a mounting member.

Meanwhile, as shown in FIG. 3B, the rod lens array 64 includes multiple rod lenses 64a arrayed in alternate arrangement in two lines in the second scan direction and held by the holder 65. Each rod lens 64a may be a gradient index lens having a cylindrical shape and a refractive-index distribution in the radial direction thereof to form an upright real image at the same magnification, for example. Examples of such a gradient index lens include a SELFOC (registered trademark of Nippon Sheet Glass Co., Ltd.) lens.

Figure 4:
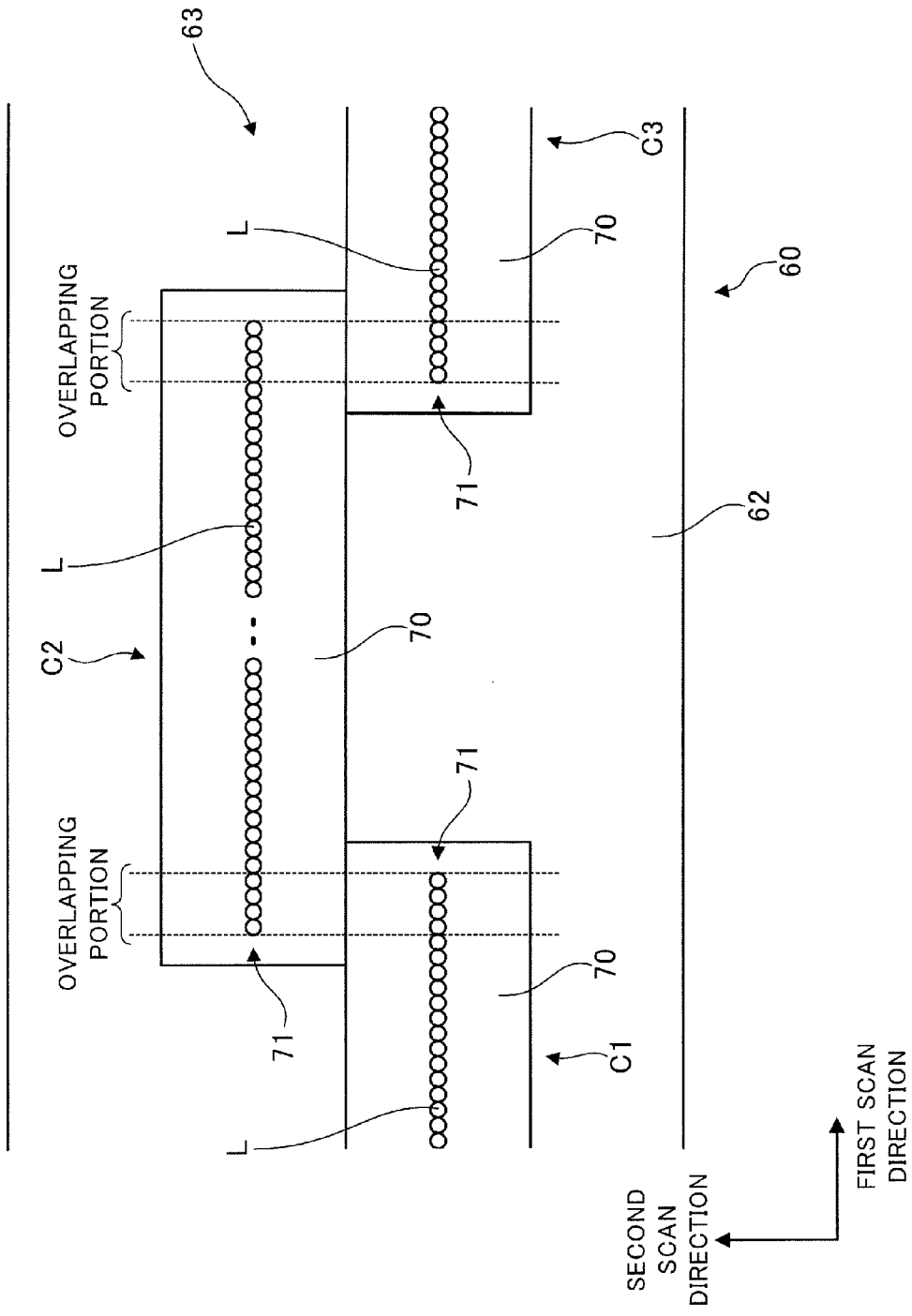
FIG. 4 is an enlarged view of a region in which the three light-emitting chips are connected in the light-emitting unit.

FIG. 4 is an enlarged view of a region in which the light-emitting chips C1, C2 and C3 are connected in the above light-emitting unit 63. Here, each of the light-emitting chips C1 to C60 has the same structure. Take the light-emitting chip C2 as an example. The light-emitting chip C2 includes a chip substrate 70 and a light-emitting element array 71. The chip substrate 70 as an example of a substrate has a rectangular shape. The light-emitting element array 71 as an example of a light-emitting element array includes light-emitting elements arranged in a line extending in a longitudinal direction on the surface of the chip substrate 70. Specifically, the light-emitting element array 71 has 260 light-emitting thyristors L as an example of a plurality of light-emitting elements arrayed in a line extending in a first scan direction. In the light-emitting element array 71, a center-to-center distance between each adjacent two light-emitting thyristors L is set to approximately 21.15 μm. Accordingly, each light-emitting unit 63, that is, each LPH 14, has an output resolution (first resolution) of 1200 dots per inch (dpi) in the first scan direction.

Moreover, as shown in FIG. 4, an overlapping portion is formed in, for example, a borderline region between the light-emitting chips C1 and C2, which are adjacent to each other. In this overlapping portion, four light-emitting thyristors L provided on a right edge portion of the light-emitting chip C1 respectively overlap four light-emitting thyristors L provided on a left edge portion of the light-emitting chip C2 in the first scan direction. Meanwhile, an overlapping portion is also formed in, for example, a borderline region between the light-emitting chips C2 and C3, which are adjacent to each other. In this overlapping portion, four light-emitting thyristors L provided on a right edge portion of the light-emitting chip C2 respectively overlap four light-emitting thyristors L provided on a left edge portion of the light-emitting chip C3 in the first scan direction. Note that a similar overlapping portion is formed in a borderline region between each adjacent two of the light-emitting chips C3 to C60.

Figure 5:
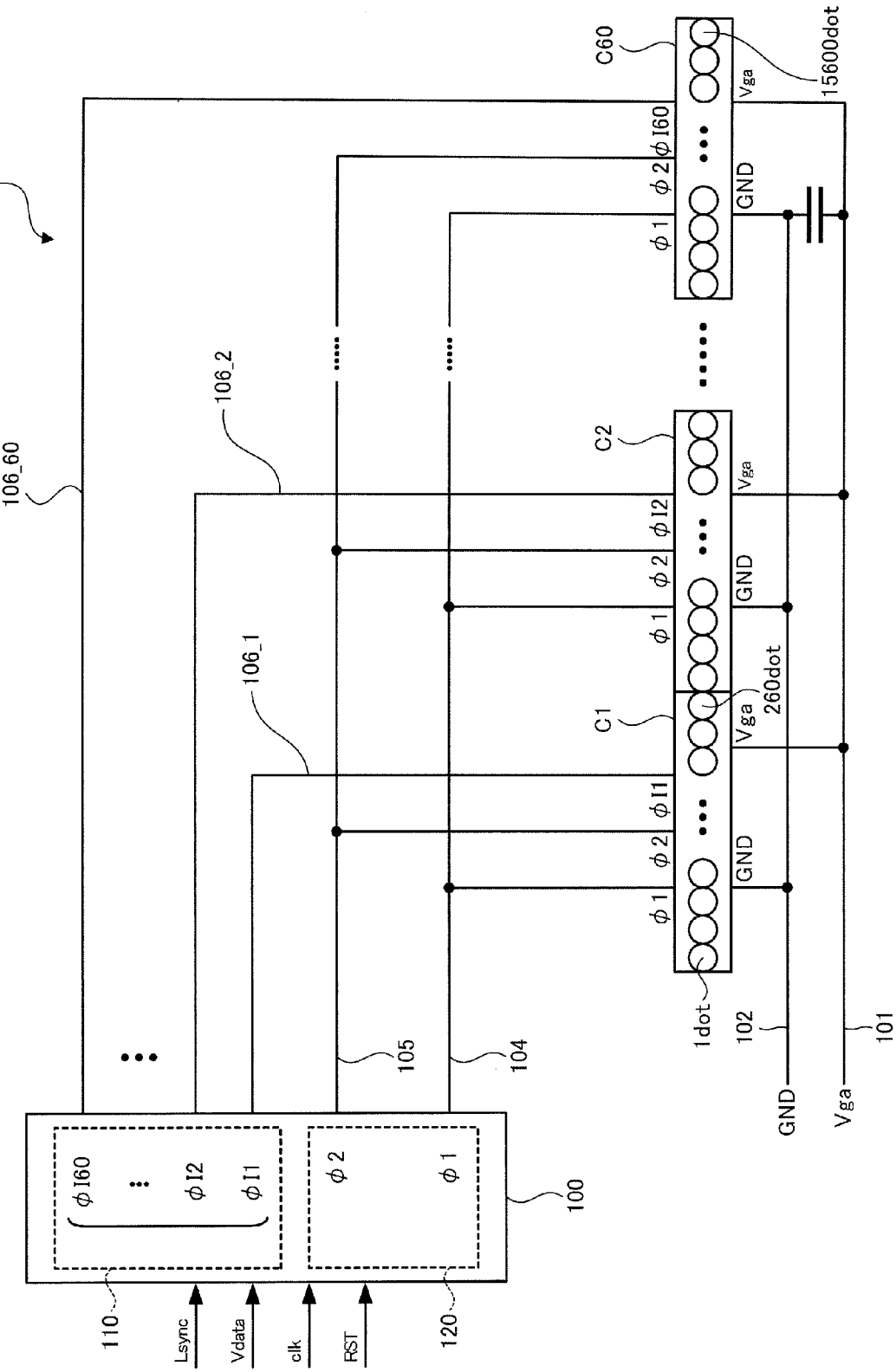
FIG. 5 shows a configuration of the signal generating circuit mounted on the circuit board and a wiring configuration of the circuit board.

FIG. 5 shows a configuration of the signal generating circuit 100 mounted on the circuit board 62 (see FIG. 2) and a wiring configuration of the circuit board 62.

The signal generating circuit 100 receives a line synchronizing signal Lsync, a video data set Vdata, a clock signal clk and various control signals such as a reset signal RST from the controller 20 (see FIG. 1). The signal generating circuit 100 includes a light-emission signal generating unit 110 as an example of a light-emission signal supply unit and a light-emission signal supply section. On the basis of the various control signals received from the outside, the light-emission signal generating unit 110 performs processes such as sorting of contents of the video data set Vdata and correction of an output value, and outputs light-emission signals φI (φI1 to φI60) to the light-emitting chips C (C1 to C60). Note that, in the present exemplary embodiment, the light-emitting chips C (C1 to C60) are supplied with the respective light-emission signals φI (φI1 to φI60).

In addition, the signal generating circuit 100 further includes a transfer signal generating unit 120 as an example of a transfer signal supply unit and a transfer signal supply section. On the basis of the various control signals received from the outside, the transfer signal generating unit 120 outputs a first transfer signal φ1 and a second transfer signal φ2 to each of the light-emitting chips C1 to C60. Here, the first transfer signal φ1 and the second transfer signal φ2 are an example of transfer signals. Note that, in the present exemplary embodiment, a single first transfer signal φ1 and a single second transfer signal φ2 are to be supplied to the light-emitting chips C (C1 to C60).

The circuit board 62 is provided with a power supply line 101 and a power supply line 102. The power supply line 101 is a line for power supply of Vga=−5.0 V, which is connected to Vga terminals of the respective light-emitting chips C1 to C60. The power supply line 102 is a ground line, which is connected to GND terminals of the respective light-emitting chips C1 to C60. The circuit board 62 is also provided with a first transfer signal line 104 and a second transfer signal line 105 through which the first transfer signal φ1 and the second transfer signal φ2 are respectively transmitted from the transfer signal generating unit 120 of the signal generating circuit 100. The circuit board 62 is also provided with 60 light-emission signal lines 106 (106_1 to 106_60) through which the light-emission signals φI (φI1 to φI60) are respectively outputted to the light-emitting chips C (C1 to C60) from the light-emission signal generating unit 110 of the signal generating circuit 100. Note that, each of the light-emission signals φI1 to φI60, the first transfer signal φ1 and the second transfer signal φ2 may be set to either a high level H or a low level (L), to be described later. The low level corresponds to an electronic potential of −5.0 V, while the high level corresponds to an electronic potential of +/−0.0 V.

Figure 6:
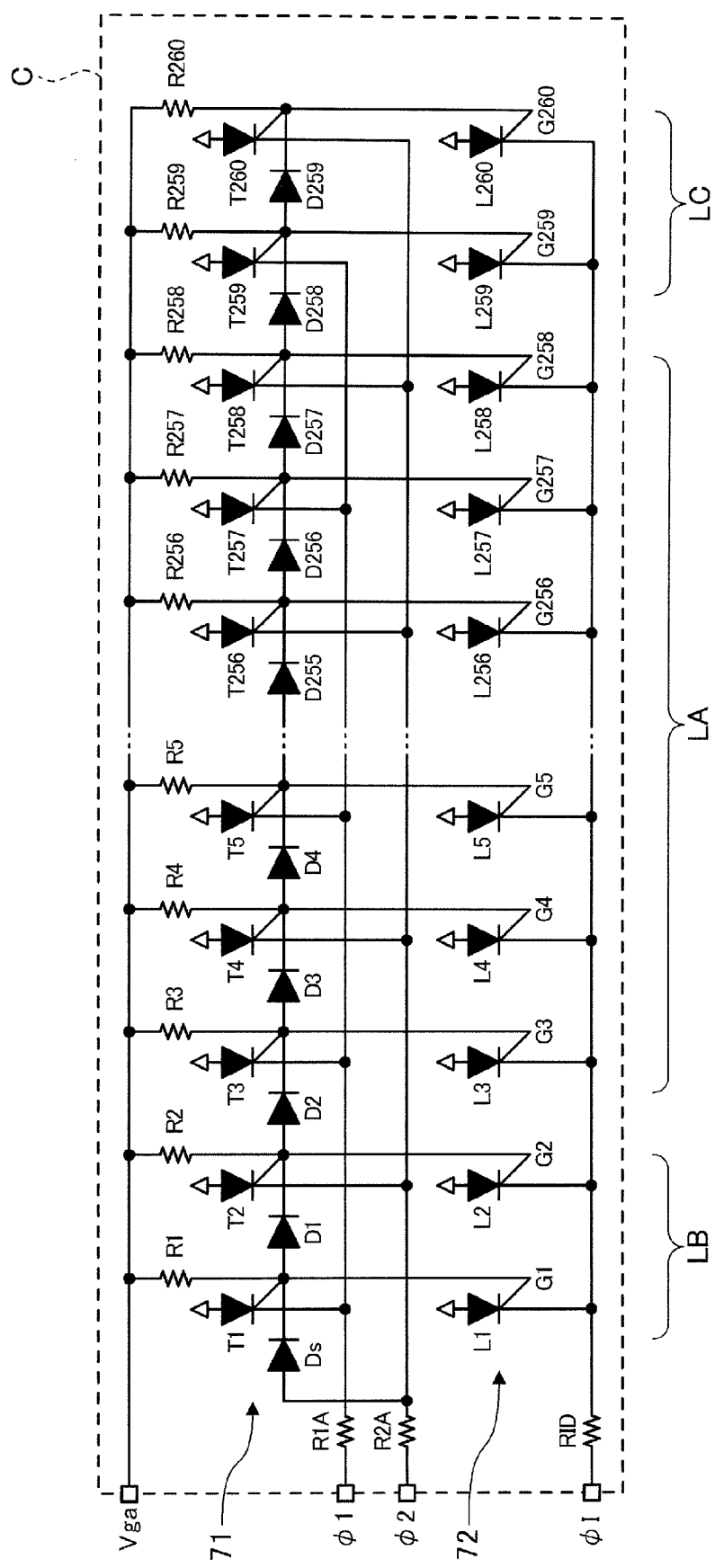
FIG. 6 is a diagram for illustrating a circuit configuration of each of the light-emitting chips.

FIG. 6 is a diagram for illustrating a circuit configuration of each of the light-emitting chips C. Note that, in the present exemplary embodiment, all of the light emitting chips C1 to C60 have the same configuration.

Each light-emitting chip C includes 260 transfer thyristors T1 to T260 and 260 light-emitting thyristors L1 to L260. Note that each of the light-emitting thyristors L1 to L260 has a pnpn junction same as each of the transfer thyristors T1 to T260, and also functions as a light-emitting diode (LED) by using a pn junction in the pnpn junction. The light-emitting chip C further includes one start diode Ds, 259 connection diodes D1 to D259 and 260 resistors R1 to R260. The light-emitting chip C further includes transfer current limiting resistors R1A and R2A and a light-emission current limiting resistor RID for preventing excessive currents from flowing through the signal lines used for supplying the first transfer signal φ1, the second transfer signal φ2, and the light-emission signals φI (light-emission signal φI1 for the light-emitting chip C1), respectively.

Note that, the light-emitting thyristors L1 to L260 constituting the light-emitting element array 71 are arrayed in the order of L1, L2, ..., L259, L260 from the left of FIG. 6, and thereby form the light-emitting element array 71. Similarly, the transfer thyristors T1 to T260, which are an example of a plurality of switch elements, are arrayed in the order of T1, T2, ..., T259, T260 from the left of FIG. 6, and thereby form a switch element array 72. Further, the connection diodes D1 to D259 are arrayed in the order of D1, D2, ..., D258, D259 from the left of FIG. 6, and the resistors R1 to R260 are arrayed in the order of R1, R2, ..., R259, R260 from the left of FIG. 6. In addition, the light-emitting element array 71 and the switch element array 72 are arranged side by side so as to be approximately in parallel.

Next, a description will be given of electrical connection among the elements in the light-emitting chip C.

First, an anode terminal of each of the transfer thyristors T1 to T260 is connected to the GND terminal (not shown in the figure) via the substrate constituting the light-emitting chips C. The GND terminal, to which the power supply line 102 (see FIG. 5) is connected, is grounded through the line.

A cathode terminal of each of the odd-numbered transfer thyristors T1, T3, ..., T259 is connected to a φ1 terminal via the transfer current limiting resistor R1A. The φ1 terminal, to which the first transfer signal line 104 (see FIG. 5) is connected, is supplied with the first transfer signal φ1 through the line.

Meanwhile, a cathode terminal of each of the even-numbered transfer thyristors T2, T4, ..., T260 is connected to a φ2 terminal via the transfer current limiting resistor R2A. The φ2 terminal, to which the second transfer signal line 105 (see FIG. 5) is connected, is supplied with the second transfer signal φ2 through the line.

Gate terminals of the transfer thyristors T1 to T260 are connected to the Vga terminal via the resistors R1 to R260 which are provided for the corresponding transfer thyristors T1 to T260. This Vga terminal, to which the power supply line 101 (see FIG. 5) is connected, is provided with a power supply voltage Vga (−5.0 V) through the line.

The gate terminals of the transfer thyristors T1 to T260 are further connected to gate terminals of the light-emitting thyristors L1 to L260, respectively. Specifically, each transfer thyristor is connected to the corresponding light-emitting thyristor, which is labeled with the same number as the transfer thyristor, on the one to one basis. Note that, in the following description, connection points between the respective gate terminals of the transfer thyristors T1 to T260 and the corresponding gate terminals of the light-emitting thyristors L1 to L260 each of which is labeled with the same number as the transfer thyristor are called as gate terminals G1 to G260.

In addition, anode terminals of the connection diodes D1 to D259 are connected to the gate terminals G1 to G259, respectively. Moreover, each cathode terminal of these connection diodes D1 to D259 is connected to an adjacent one of the gate terminal G2 to G260 of the transfer thyristors T2 to T260 that is labeled with a number larger by one than a number labeled for the connection diode.

On the other hand, an anode terminal of the start diode Ds is connected to the φ2 terminal via the transfer current limiting resistor R2A. A cathode terminal of the start diode Ds is connected to the gate terminal G1 of the transfer thyristor T1.

Next, an anode terminal of each of the light-emitting thyristors L1 to L260 is connected to the GND terminal (not shown in the figure) via the substrate constituting the light-emitting chip C, similarly to the anode terminal of each of the transfer thyristors T1 to T260.

A cathode terminal of each of the light-emitting thyristors L1 to L260 is connected to a φI terminal via the light-emission current limiting resistor RID. The φI terminal, to which the light-emission signal line 106 (the light-emission signal line 106_1 for the light-emitting chip C1: see FIG. 5) is connected, is supplied with the light-emission signal φI (the light-emission signal φI1 for the light-emitting chip C1) through the line. Note that, the other light-emitting chips C2 to C60 are supplied with the corresponding light-emission signals φI2 to φI60, respectively.

Here, as the light-emitting unit 63 is formed, the four light-emitting thyristors L1 to L4 provided on a left side of FIG. 6 and the four light-emitting thyristors L257 to L260 provided on a right side of FIG. 6 in each light-emitting chip C constitute overlapping portions shown in FIG. 4.

Note that, each light-emitting chip C has the 260 light-emitting thyristors L1 to L260 in total as described above. However, each light-emitting chip C uses light-emitting thyristors less than the total 260 light-emitting thyristors, as luminous points in an actual image forming operation. Here, the "luminous point" indicates a light-emitting thyristor L that is caused to emit light or not to emit light in an image forming operation (exposure operation). To be more specific, the 256 light-emitting thyristors L3 to L258, which are consecutively provided in a center portion, are normally used as luminous points. However, depending on a result of position correction in the first scan direction to be described later, the 256 consecutive light-emitting thyristors including either the light-emitting thyristors L1 and L2, provided on the left side of FIG. 6, or the light-emitting thyristors L259 and L260, provided on the right side of FIG. 6, may sometimes be used as luminous points.

However, in the overlapping portion of each adjacent two light-emitting chips C (for example, the light-emitting chips C1 and C2), any one of each two light-emitting thyristors provided at the same point in the first scan direction (for example, any one of the light-emitting thyristor L258 of the light-emitting chip C1 and the light-emitting thyristor L2 of the light-emitting chip C2) is used as a luminous point, but the other is not. Note that, in the following description, among the light-emitting thyristors L1 to L260 constituting each light-emitting chip C, a light-emitting thyristor L that is not used as a luminous point will be referred to as a "non-luminous point."

In the following description, the 256 light-emitting thyristors L3 to L258 provided in the center portion of each light-emitting chip C are collectively referred to as a normal luminous-point group LA. Meanwhile, the two light-emitting thyristors L1 and L2 provided in a leftmost portion of the light-emitting chip C are collectively referred to as a first standby luminous-point group LB, and the two light-emitting thyristors L259 and L260 provided in a rightmost portion of the light-emitting chip C are collectively referred to as a second standby luminous-point group LC. Here, the normal luminous-point group LA, the first standby luminous-point group LB and the second standby luminous-point group LC are equivalent to a first light-emitting element group, a second light-emitting element group and a third light-emitting element group, respectively.

Figure 7:
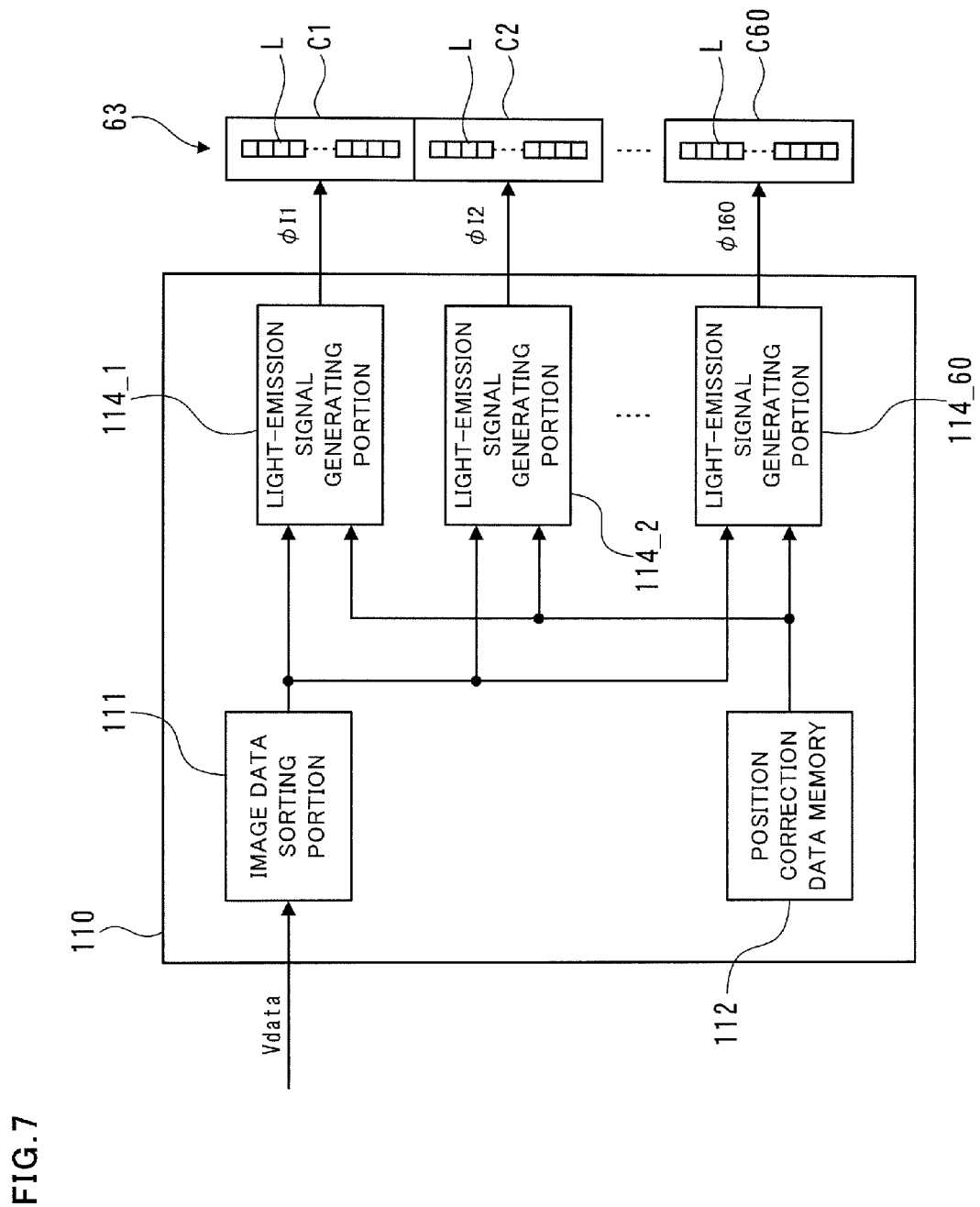
FIG. 7 shows an example of a configuration of the light-emission signal generating unit.

FIG. 7 shows an example of a configuration of the light-emission signal generating unit 110 shown in FIG. 5.

The light-emission signal generating unit 110 includes an image data sorting portion 111. The image data sorting portion 111 sorts contents of received video data set Vdata, and outputs, to the light-emitting chips C1 to C60, different image data sets dedicated thereto, respectively. The light-emission signal generating unit 110 further includes a position correction data memory 112. The position correction data memory 112 stores therein data sets on position correction in the first scan direction predefined for the respective light-emitting chips C1 to C60. Moreover, the light-emission signal generating unit 110 further includes 60 light-emission signal generating portions 114 (114_1 to 114_60) provided for the respective light-emitting chips C1 to C60. Each light-emission signal generating portion 114 performs the following correction on the image data set dedicated to the corresponding light-emitting chip, which is inputted from the image data sorting portion 111. The correction is performed by using the position correction data set dedicated to this light-emitting chip, which is read out from the position correction data memory 112. Thereafter, the light-emission signal generating portions 114 output the respective light-emission signals ϕI1 to ϕI60 obtained through the correction.

Note that, though the light-emitting unit 63 constituting each LPH 14 has an output resolution of 1200 dpi in the first scan direction as described above, the video data set Vdata inputted into the light-emission signal generating unit 110 has a resolution (second resolution) of 600 dpi in the first scan direction in the present exemplary embodiment. In other words, the resolution of the light-emission signal generating unit 110 is half (½) of the output resolution of the LPH 14. Accordingly, in the present exemplary embodiment, a new twist is added to the method in which the transfer signal generating unit 120 generates the first transfer signal ϕ1 and the second transfer signal ϕ2 and the method in which the light-emission signal generating portions 114 (114_1 to 114_60) of the light-emission signal generating unit 110 generate the respective light-emission signals ϕI (ϕI1 to ϕI60), in order to operate the light-emitting unit 63 with an output resolution of approximately 600 dpi. This is achieved by causing each of the light-emitting chips C (C1 to C60), which correspond to the respective light-emission signal generating portions 114, to drive a pair of two light-emitting thyristors L consecutively in the first scan direction as a unit. In addition, in the present exemplary embodiment, position correction in the first scan direction, which will be described later, is performed by causing the pairs each having the two light-emitting thyristors L consecutively in the first scan direction to be shifted by one or two at the most in each of the light-emitting chips C (C1 to C60).

Hereinbelow, a description will be given of the position correction in the first scan direction performed in each LPH 14.

In the present exemplary embodiment, an image is formed by using the four image forming units 11 (11Y, 11M, 11C, 11K) in the image forming apparatus 1 as described with reference to FIG. 1. Accordingly, the LPHs 14 are provided for these respective colors. However, the accuracy limitations of a frame of the image forming apparatus 1 to which each LPH 14 is mounted and of the LPH 14 itself make it difficult to mount the LPHs 14 to the image forming apparatus 1 so that the positions of the LPHs 14 are aligned with respect to the image forming apparatus 1 in the first scan direction. Thus, in this image forming apparatus 1, position correction in the first scan direction is performed in each LPH 14 in order to accurately align positions of light beams emitted by the respective LPHs 14 in the first scan direction.

Figure 8:
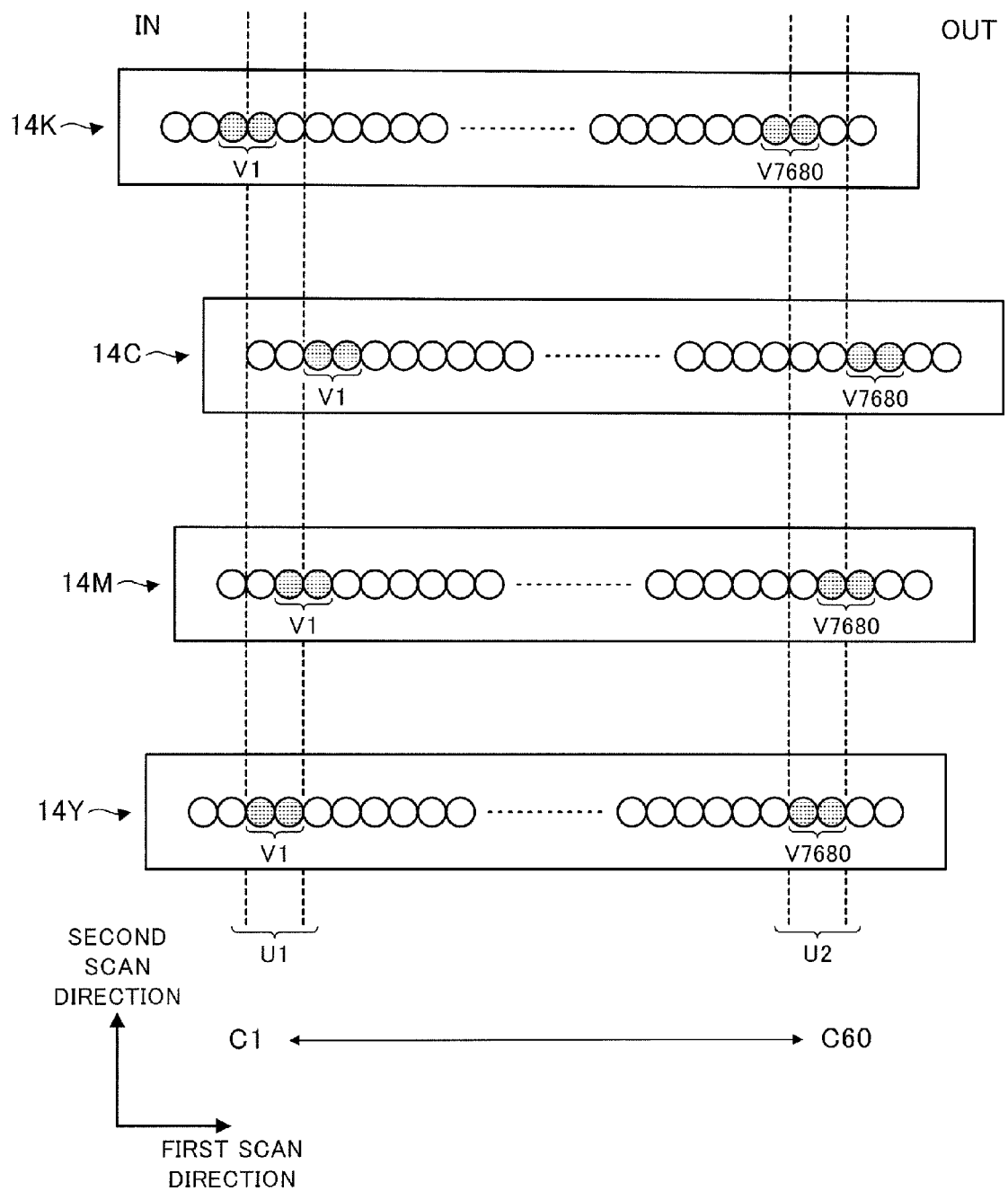
FIG. 8 shows an example in which the LPHs are mounted on the frames of the image forming apparatus, respectively.

FIG. 8 shows an example in which the LPHs 14 (14Y, 14M, 14C and 14K, specifically) constituting the image forming units 11 (11Y, 11M, 11C and 11K, specifically) are mounted on the frames (not shown in the figure) of the image forming apparatus 1, respectively. Note that, the left and right sides of FIG. 8 respectively correspond to the front (IN) and back (OUT) sides of the image forming apparatus 1 shown in FIG. 1. Incidentally, the position correction in the first scan direction is performed by using any one of the LPHs 14 as the reference. The following description will be given of the case where position correction in the first scan direction is performed on each of the magenta LPH 14M, the cyan LPH 14C and the black LPH 14K by using the yellow LPH 14Y as the reference.

Note that, in the initial condition before the position correction in the first scan direction is performed, the normal luminous-point group LA (light-emitting thyristors L3 to L258) is to be set as luminous points in each of the light-emitting chips C1 to C60 of the LPHs 14. Thus, the first luminous point, which lies at the IN-side end of each LPH 14, is the light-emitting thyristor L3 (see FIG. 6) of the light-emitting chip C1, while the 15360-th luminous point, which lies at the OUT-side end of each LPH 14, is the light-emitting thyristor L258 (see FIG. 6) of the light-emitting chip C60.

In addition, in the present exemplary embodiment, each pixel of an image is formed of two luminous points so that the LPHs 14 each having an output resolution of 1200 dpi in the first scan direction is used to output 600 dpi data as described above. Thus, the initial condition includes the settings where the light-emitting thyristors L3 and L4 (first and second luminous points: see FIG. 6) of each light-emitting chip C1 is used to form a first pixel V1, and where the light-emitting thyristors L257 and L258 (15359-th and 15360-th luminous points: see FIG. 6) of each light-emitting chip C60 is used to form a 7680-th pixel V7680. Here, assume that the positions of the first pixel V1 and the 7680-th pixel V7680 in the first scan direction in the yellow LPH 14Y are a first reference position U1 and a second reference position U2, respectively.

Then, in the magenta LPH 14M, the position of the first pixel V1 in the first scan direction shifts to the OUT side by 0.5 pixel (one luminous point) with respect to the first reference position U1, and the position of the 7680-th pixel V7680 in the first scan direction shifts to the OUT side by 0.5 pixel (one luminous point) with respect to the second reference position U2. Accordingly, the magenta LPH 14M exhibits a positional shift of 0.5 pixel to the OUT side in the first scan direction with respect to the yellow LPH 14Y. Such a positional shift will be referred to as OUT-side half pixel shift in the following description.

Meanwhile, in the cyan LPH 14C, the position of the first pixel V1 in the first scan direction shifts to the OUT side by one pixel (two luminous points) with respect to the first reference position U1, and the position of the 7680-th pixel V7680 in the first scan direction shifts to the OUT side by 1 pixel (two luminous points) with respect to the second reference position U2. Accordingly, the cyan LPH 14C exhibits a positional shift of 1 pixel to the OUT side in the first scan direction with respect to the yellow LPH 14Y. Such a positional shift will be referred to as OUT-side one pixel shift in the following description.

On the other hand, in the black LPH 14K, the position of the first pixel V1 in the first scan direction shifts to the IN side by 0.5 pixel (one luminous point) with respect to the first reference position U1, and the position of the 7680-th pixel V7680 in the first scan direction shifts to the IN side by 0.5 pixel (one luminous point) with respect to the second reference position U2. Accordingly, the black LPH 14K exhibits a positional shift of 0.5 pixel to the IN side in the first scan direction with respect to the yellow LPH 14Y. Such a positional shift will be referred to as IN-side half pixel shift in the following description.

In addition to the above, the case may occur where the position of the first pixel V1 in the first scan direction shifts to the IN side by 1 pixel (two luminous points) with respect to the first reference position U1, and the position of the 7680-th pixel V7680 in the first scan direction also shifts to the IN side by 1 pixel (two luminous points) with respect to the second reference position U2, so that a positional shift of 1 pixel occurs to the IN side in the first scan direction. Such a positional shift will be referred to as IN-side one pixel shift in the following description.

FIG. 9 is a table for illustrating relationships between respective colors of yellow, magenta, cyan and black and position correction data sets R which are stored in the position correction data memories 112 (see FIG. 7) provided in the respective LPHs 14. Here, FIG. 9 shows position correction data sets R set in the case where the yellow LPH 14Y, the magenta LPH 14M, the cyan LPH 14C and the black LPH 14K are mounted in the image forming apparatus 1 in the condition shown in FIG. 8. Note that the position correction data set R for each light-emitting chip C is acquired at the time of factory shipment or replacement of each LPH 14, for example, and stored in the position correction data memory 112. Then, in each LPH 14, the light-emission signal generating portions 114_1 to 114_60 read out the position correction data set R from the position correction data memory 112, and the position correction in the first scan direction is uniformly performed for 60 light-emitting chips C1 to C60 constituting each LPH 14 by using the position correction data set R having the same value.

As shown in FIG. 9, a position correction data set R of "0" is set for the yellow LPH 14Y, which is used as the reference for position adjustment in the first scan direction. A position correction data set R of "−1" is set for the magenta LPH 14M, which exhibits the OUT-side half pixel shift with respect to the yellow LPH 14Y. A position correction data set R of "−2" is set for the cyan LPH 14C, which exhibits the OUT-side one pixel shift with respect to the yellow LPH 14Y. A position correction data set R of "+1" is set for the black LPH 14K, which exhibits the IN-side half pixel shift with respect to the yellow LPH 14Y. Note that if there is any LPH 14 that exhibits the IN-side one pixel shift with respect to the yellow LPH 14Y, a position correction data set R of "+2" is to be set for the LPH 14.

FIGS. 10A to 10E are diagrams each for illustrating a relationship between the above-described position correction data set R and changes in luminous points in each light-emitting chip C caused by position correction. Here, FIGS. 10A to 10E show the cases of R=0, R=−1, R=−2, R=+1 and R=+2, respectively.

Figure 10A:
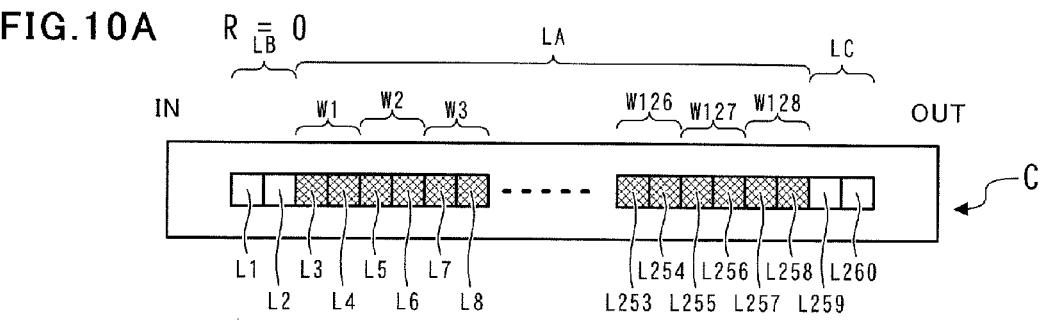
FIGS. 10A to 10E are diagrams each for illustrating a relationship between the position correction data set and changes in luminous points in each light-emitting chip caused by position correction.

As shown in FIG. 10A, with R=0, the normal luminous-point group LA, that is, the light-emitting thyristors L3 to L258 remain set as the luminous points in the light-emitting chip C. As a result, the light-emitting chip C forms 128 pixels W1 to W128 by using the 256 light-emitting thyristors L3 to L258. In this event, each of the pixels W1 to W128 is formed of an odd-numbered light-emitting thyristor and an even-numbered light-emitting thyristor that is adjacent to the right side of the odd-numbered light-emitting thyristor. Specifically, the pixel W1 on the left side of FIG. 10A is formed of the light-emitting thyristors L3 and L4, while the pixel W128 on the right side of FIG. 10A is formed of the light-emitting thyristors L257 and L258, for example.

Figure 10B:
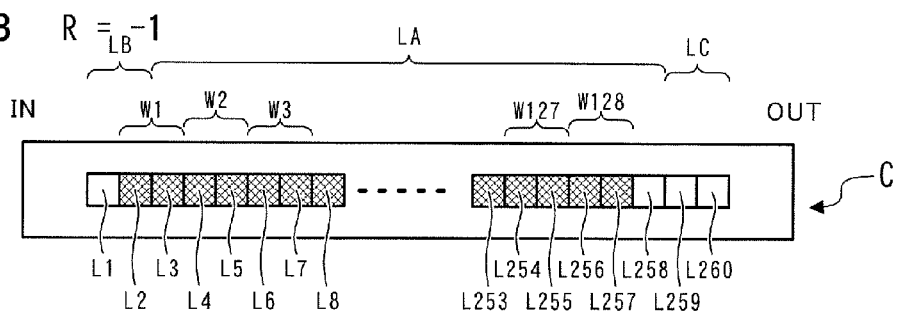

On the other hand, as shown in FIG. 10B, with R=−1, all the light-emitting thyristors of the normal luminous-point group LA except the light-emitting thyristor L258, and the light-emitting thyristor L2 of the first standby luminous-point group LB are set as the luminous points in the light-emitting chip C. In other words, the luminous points in the light-emitting chip C are set to the light-emitting thyristors L2 to L257, and thus the luminous points shift by one to the IN side. As a result, the light-emitting chip C forms the 128 pixels W1 to W128 by using the 256 light-emitting thyristors L2 to L257. In this event, each of the pixels W1 to W128 is formed of an even-numbered light-emitting thyristor and an odd-numbered light-emitting thyristor that is adjacent to the right side of the even-numbered light-emitting thyristor. Specifically, the pixel W1 on the left side of FIG. 10B is formed of the light-emitting thyristors L2 and L3, while the pixel W128 on the right side of FIG. 10B is formed of the light-emitting thyristors L256 and L257, for example.

Figure 10C:
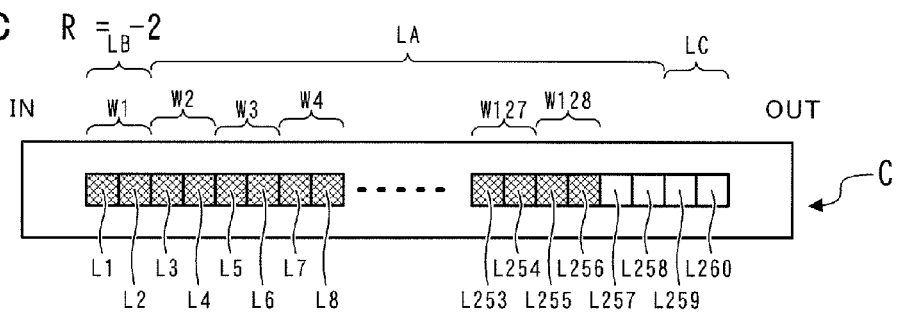

Further, as shown in FIG. 10C, with R=−2, all the light-emitting thyristors of the normal luminous-point group LA except the light-emitting thyristors L257 and L258, and the light-emitting thyristors L1 and L2 of the first standby luminous-point group LB are set as the luminous points in the light-emitting chip C. In other words, the luminous points in the light-emitting chip C are set to the light-emitting thyristors L1 to L256, and thus the luminous points shift by two to the IN side. As a result, the light-emitting chip C forms the 128 pixels W1 to W128 by using the 256 light-emitting thyristors L1 to L256. In this event, each of the pixels W1 to W128 is formed of an odd-numbered light-emitting thyristor and an even-numbered light-emitting thyristor that is adjacent to the right side of the odd-numbered light-emitting thyristor. Specifically, the pixel W1 on the left side of FIG. 10C is formed of the light-emitting thyristors L1 and L2, while the pixel W128 on the right side of FIG. 10C is formed of the light-emitting thyristors L255 and L256, for example.

Figure 10D:
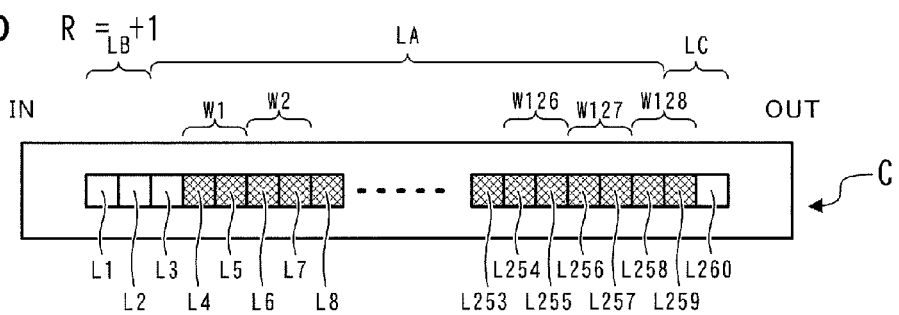

By contrast, as shown in FIG. 10D, with R=+1, all the light-emitting thyristors of the normal luminous-point group LA except the light-emitting thyristor L3, and the light-emitting thyristor L259 of the second standby luminous-point group LC are set as the luminous points in the light-emitting chip C. In other words, the luminous points in the light-emitting chip C are set to the light-emitting thyristors L4 to L259, and thus the luminous points shift by one to the OUT side. As a result, the light-emitting chip C forms the 128 pixels W1 to W128 by using the 256 light-emitting thyristors L4 to L259. In this event, each of the pixels W1 to W128 is formed of an even-numbered light-emitting thyristor and an odd-numbered light-emitting thyristor that is adjacent to the right side of the even-numbered light-emitting thyristor. Specifically, the pixel W1 on the left side of FIG. 10D is formed of the light-emitting thyristors L4 and L5, while the pixel W128 on the right side of FIG. 10D is formed of the light-emitting thyristors L258 and L259, for example.

Figure 10E:
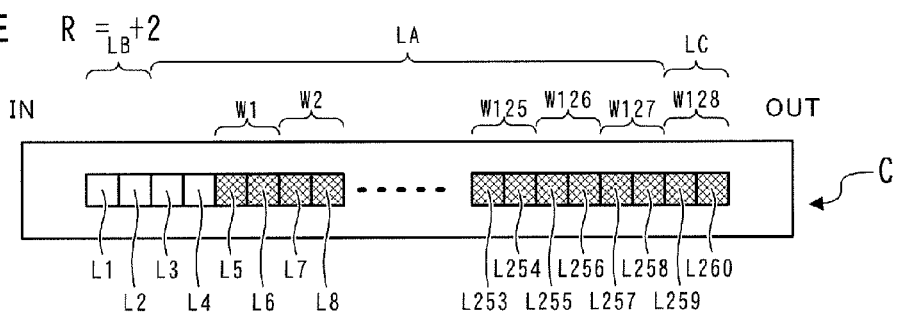

Further, as shown in FIG. 10E, with R=+2, all the light-emitting thyristors of the normal luminous-point group LA except the light-emitting thyristors L3 and L4, and the light-emitting thyristors L259 and L260 of the second standby luminous-point group LC are set as the luminous points in the light-emitting chip C. In other words, the luminous points in the light-emitting chip C are set to the light-emitting thyristors L5 to L260, and thus the luminous points shift by two to the OUT side. As a result, the light-emitting chip C forms the 128 pixels W1 to W128 by using the 256 light-emitting thyristors L5 to L260. In this event, each of the pixels W1 to W128 is formed of an odd-numbered light-emitting thyristor and an even-numbered light-emitting thyristor that is adjacent to the right side of the odd-numbered light-emitting thyristor. Specifically, the pixel W1 on the left side of FIG. 10E is formed of the light-emitting thyristors L5 and L6, while the pixel W128 on the right side of FIG. 10E is formed of the light-emitting thyristors L259 and L260, for example.

As described above, in the present exemplary embodiment, the 128 pairs, that is, the 256 light-emitting thyristors L are always set as the luminous points in each light-emitting chip C independently of the value of the position correction data set R, and thus the remaining 4 light-emitting thyristors L are set as the non-luminous points.

Hereinbelow, a description will be given of the exposure operation performed by each LPH 14 of the image forming apparatus 1 shown in FIG. 1.

Upon start of the image forming operation, the controller 20 transmits video data sets Vdata to the signal generating circuits 100 of the LPHs 14 constituting the image forming units 11, respectively. In response, in the signal generating circuit 100 provided in each LPH 14, the transfer signal generating unit 120 outputs, to 60 light-emitting chips C (C1 to C60) constituting the light-emitting unit 63, the first transfer signal $\phi1$ and the second transfer signal $\phi2$, which are generated on the basis of the received control signals and the like. In addition, in the signal generating circuit 100, the light-emission signal generating unit 110 outputs the 60 light-emission signals $\phi I$ ($\phi I1$ to $\phi I60$) to the respective 60 light-emitting chips C (C1 to C60) constituting the light-emitting unit 63. Here, the light-emission signals $\phi I1$ to $\phi I60$ correspond to one line in the first scan direction and are generated on the basis of the received video data sets Vdata. In response, in the light-emitting unit 63 of each LPH 14, each of the light-emitting chips C1 to C60 causes the light-emitting thyristors L1 to L260 mounted thereon independently to emit light or not to emit light in accordance with the received one of the light-emission signals $\phi I1$ to $\phi I60$, and thereby selectively exposes the corresponding photoconductor drum 12. Note that, in this event, each of the light-emitting chips C1 to C60 sets its light-emitting thyristors L1 to L260 as follows. Specifically, the light-emitting chip C causes each of the light-emitting thyristors L that are set as luminous points either to emit light or not to emit light, while causes each of the light-emitting thyristors L that are set as non-luminous points not to emit light.

FIGS. 11A to 11D show luminous points of the light-emitting chips C1 to C6 in the LPHs 14 mounted on the image forming apparatus 1 in the condition shown in FIG. 8. Here, FIGS. 11A to 11D show the yellow LPH 14Y, the magenta LPH 14M, the cyan LPH 14C and the black LPH 14K, respectively. Note that, the luminous points of the light-emitting chips C (C1 to C60) constituting each LPH 14 are corrected on the basis of the corresponding ones of the position correction data sets R for the respective colors shown in FIG. 9.

As shown in FIG. 11A, the normal luminous-point group LA is set as the luminous points in each of the light-emitting chips C1 to C60 of the yellow LPH 14Y. This makes the luminous points consecutive in the first scan direction, in the overlapping portion (see FIG. 4) of each adjacent two of the light-emitting chips C1 to C60.

By contrast, as shown in FIG. 11B, the luminous point group shifted by one luminous point to the IN side with respect to the normal luminous-point group LA is set as the luminous points in each of the light-emitting chips C1 to C60 of the magenta LPH 14M. This corrects the OUT-side half pixel shift of the magenta LPH 14M shown in FIG. 8 to make the luminous points thereof consistent with those of the yellow LPH 14Y. In this case as well, the luminous points are consecutive in the first scan direction, in the overlapping portion (see FIG. 4) of each adjacent two of the light-emitting chips C1 to C60.

Meanwhile, as shown in FIG. 11C, the luminous point group shifted by two luminous points to the IN side with respect to the normal luminous-point group LA is set as the luminous points in each of the light-emitting chips C1 to C60 of the cyan LPH 14C. This corrects the OUT-side one pixel shift of the cyan LPH 14C shown in FIG. 8 to make the luminous points thereof consistent with those of the yellow LPH 14Y. In this case as well, the luminous points are consecutive in the first scan direction, in the overlapping portion (see FIG. 4) of each adjacent two of the light-emitting chips C1 to C60.

Moreover, as shown in FIG. 11D, the luminous point group shifted by one luminous point to the OUT side with respect to the normal luminous-point group LA is set as the luminous points in each of the light-emitting chips C1 to C60 of the black LPH 14K. This corrects the IN-side half pixel shift of the black LPH 14K shown in FIG. 8 to make the luminous points thereof consistent with those of the yellow LPH 14Y. In this case as well, the luminous points are consecutive in the first scan direction, in the overlapping portion (see FIG. 4) of each adjacent two of the light-emitting chips C1 to C60.

Note that, in the position correction as described above, the image data sets dedicated to the respective light-emitting chips C need not be shifted between each adjacent two light-emitting chips C. Instead, position adjustment in the first scan direction is appropriately achieved only by shifting the luminous points in each light-emitting chip C.

Next, a detailed description will be given of the operation of each of the light-emitting chips C1 to C60 constituting each LPH 14.

In the present exemplary embodiment, light emission control is performed on the light-emitting chips C1 to C60 by supplying the first and second transfer signals $\phi1$ and $\phi2$ in common to the light-emitting chips C1 to C60, while supplying the light-emission signals $\phi I1$ to $\phi I60$ respectively to the light-emitting chips C1 to C60.

Figure 12:
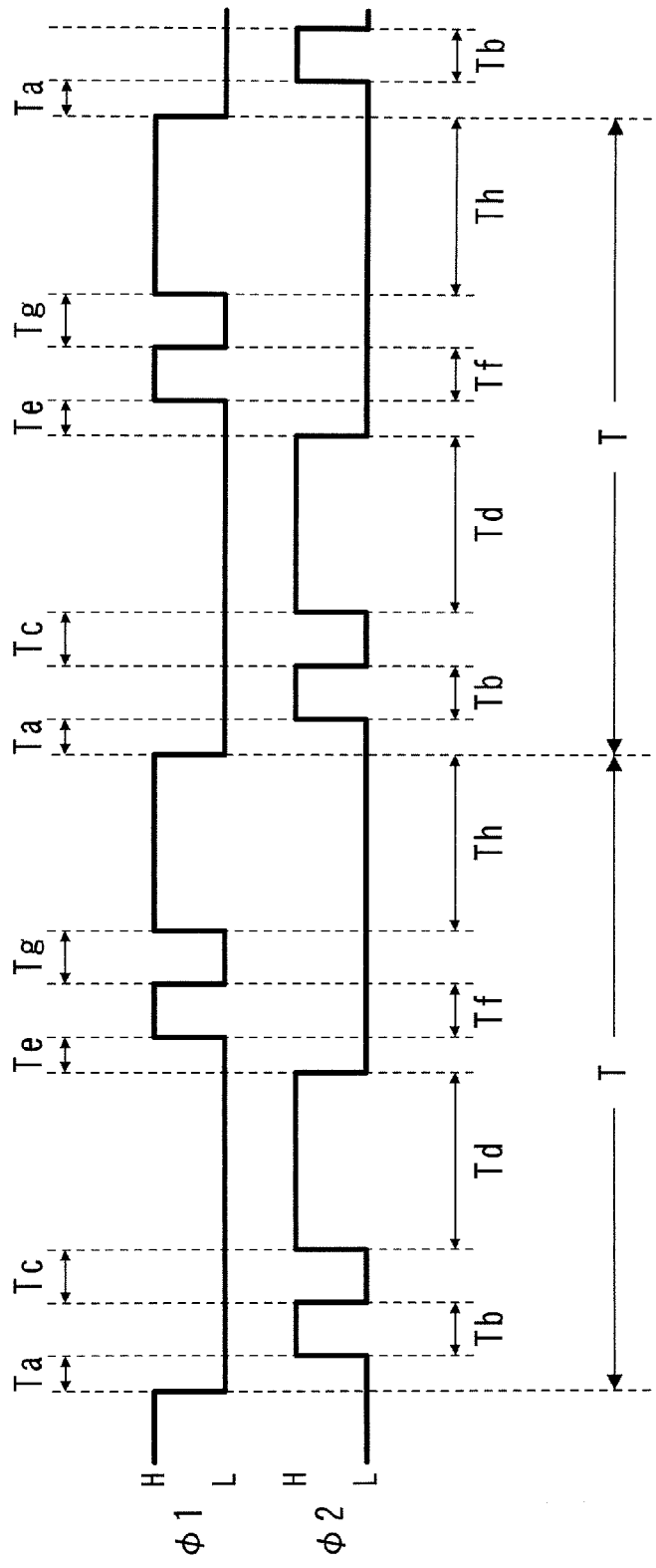
FIG. 12 illustrates waveforms respectively of the first and second transfer signals supplied in common to the light-emitting chips.

FIG. 12 illustrates waveforms respectively of the first and second transfer signals $\phi1$ and $\phi2$ supplied in common to the light-emitting chips C1 to C60. FIG. 13 illustrates the states of the first and second transfer signals $\phi1$ and $\phi2$ in the periods shown in FIG. 12. Note that, in the following description, the first and second transfer signals $\phi1$ and $\phi2$ are set to the high level (H) and the low level (L), respectively, in the initial state.

As shown in FIGS. 12 and 13, the first and second transfer signals φ1 and φ2 are sequentially and successively provided with first to eighth periods Ta to Th. In the first period Ta, the first transfer signal φ1 is kept at the low level after changed from the high level, while the second transfer signal φ2 continues to be kept at the low level. In the second period Tb, the first transfer signal φ1 continues to be kept at the low level, while the second transfer signal φ2 is kept at the high level after changed from the low level. In the third period Tc, the first transfer signal φ1 continues to be kept at the low level, while the second transfer signal φ2 is kept at the low level after changed from the high level. In the fourth period Td, the first transfer signal φ1 continues to be kept at the low level, while the second transfer signal φ2 is kept at the high level after changed from the low level. In the fifth period Te, the first transfer signal φ1 continues to be kept at the low level, while the second transfer signal φ2 is kept at the low level after changed from the high level. In the sixth period Tf, the first transfer signal φ1 is kept at the high level after changed from the low level, while the second transfer signal φ2 continues to be kept at the low level. In the seventh period Tg, the first transfer signal φ1 is kept at the low level after changed from the high level, while the second transfer signal φ2 continues to be kept at the low level. In the eighth period Th, the first transfer signal φ1 is kept at the high level after changed from the low level, while the second transfer signal φ2 continues to be kept at the low level.

After the eighth period Th elapses, the first period Ta is provided to the first and second transfer signals φ1 and φ2, again. In this way, the first and second transfer signals φ1 and φ2 repeatedly provided with the sequence of the first to eighth periods Ta to Th are supplied. Thus, the light-emitting chips C1 to C60 are provided with the first and second transfer signals φ1 and φ2 repeating the sequence of the first to eighth periods Ta to Th as a cycle, namely, transfer cycle T.

Note that, as is clear from FIGS. 12 and 13, the first and second transfer signals φ1 and φ2 in the periods Ta to Td have a reverse relative level relation (high-low level relation) from that in the periods Te to Th.

As described above, in the present exemplary embodiment, the first and second transfer signals φ1 and φ2 are alternately switched between the high level and the low level while an overlapping period (any one of the first and fifth periods Ta and Te) during which both of them are set to the low level is interposed between each adjacent two periods during which they are set to the mutually different levels. However, in the period after the end point of the first period Ta during which the first transfer signal φ1 is set to the low level and before the start point of the fifth period Te, the third period Tc during which the second transfer signal φ2 is set to the low level is provided between the second and fourth periods Tb and Td during which the second transfer signal φ2 is set to the high level. In addition, in the period after the end point of the fifth period Te during which the second transfer signal φ2 is set to the low level and before the start point of the next first period Ta, the seventh period Tg during which the first transfer signal φ1 is set to the low level is provided between the sixth and eighth periods Tf and Th during which the first transfer signal φ1 is set to the high level. In other words, the first and second transfer signals φ1 and φ2 are both set to the low level in the first period Ta, the third period Tc, the fifth period Te and the seventh period Tg. By contrast, one of the first and second transfer signals φ1 and φ2 is set to the high level and the other is set to the low level in the second period Tb, the fourth period Td, the sixth period Tf and the eighth period Th.

In the present exemplary embodiment, the timing of switching between the low level and the high level for defining the third period Tc is set so as to make the fourth period Td longer than the second period Tb. Similarly, the timing of switching between the low level and the high level for defining the seventh period Tg is set so as to make the eighth period Th longer than the sixth period Tf. In addition, the third and seventh periods Tc and Tg are set shorter than the fourth and eighth periods Td and Th, respectively. The reason will be described later.

As described above, in the present exemplary embodiment, a pair of two light-emitting thyristors L sequentially adjacent to each other in the first scan direction is driven at a time in each of the light-emitting chips C1 to C60. In addition, each pair is shifted for position correction in the first scan direction in each LPH 14. Specifically, the pair is set either to a pair of an odd-numbered light-emitting thyristor L and an even-numbered light-emitting thyristor L next thereto, or to a pair of an even-numbered light-emitting thyristor L and an odd-numbered light-emitting thyristor L next thereto.

Hereinafter, a description will be given of the operation of each light-emitting chip C in the following two modes. Firstly, with reference to FIGS. 14 and 15, a description will be given of the case of driving a pair of an odd-numbered light-emitting thyristor and an even-numbered light-emitting thyristor downstream therefrom and adjacent thereto at a time (the case will be referred to as odd-even mode, which is equivalent to the first mode).

Secondly, with reference to FIGS. 16 and 17, a description will be given of the case of driving a pair of an even-numbered light-emitting thyristor and an odd-numbered light-emitting thyristor downstream therefrom and adjacent thereto at a time (the case will be referred to as even-odd mode, which is equivalent to the second mode).

Note that each LPH 14 whose position correction data set R is set to 0, −2 or +2 operates in the odd-even mode, while each LPH 14 whose position correction data set R is set to −1 or +1 operates in the even-odd mode. However, in the following description, the position correction in the first scan direction will not be taken into consideration for simplicity.

Figure 14:
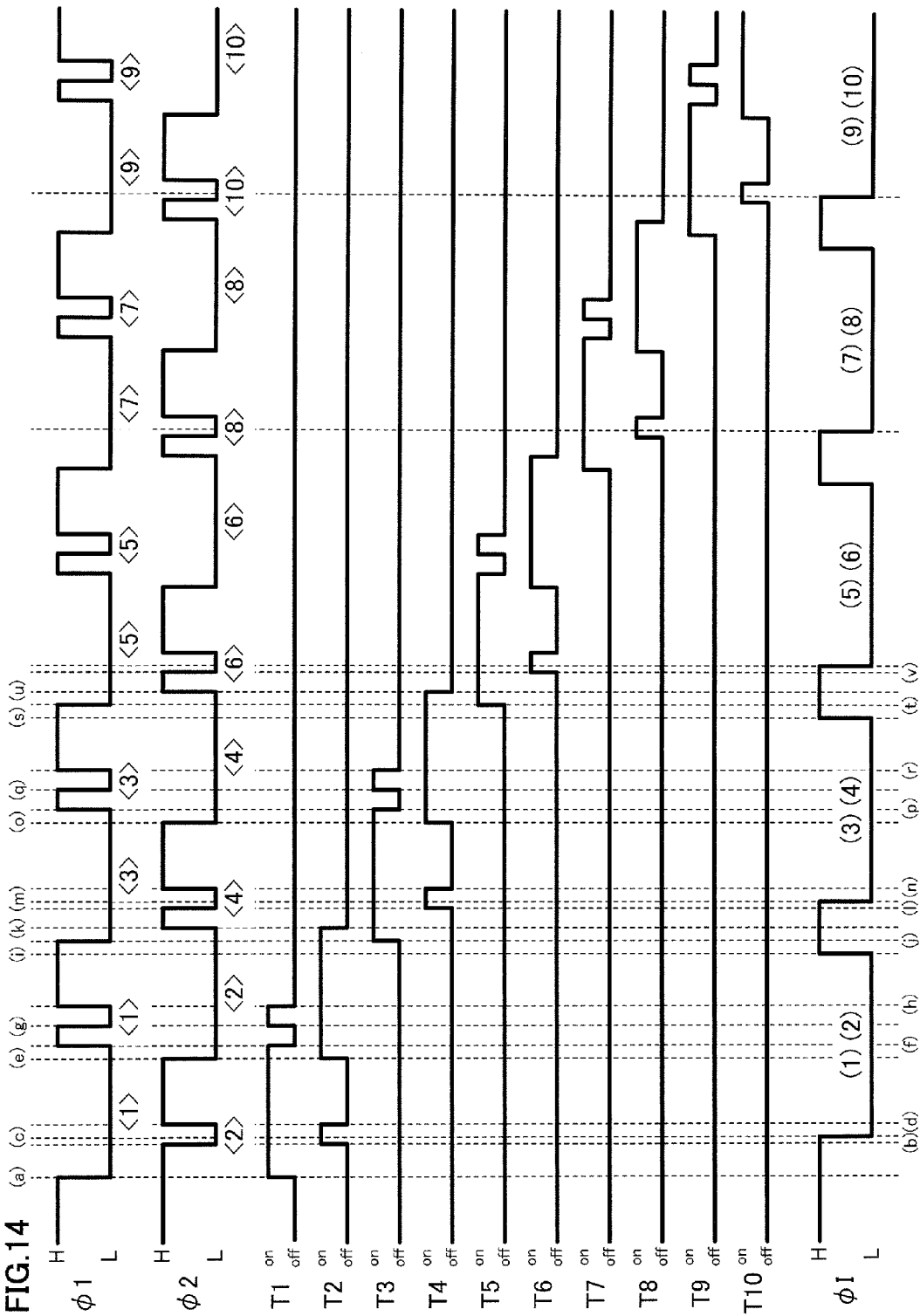
FIG. 14 is a timing chart for illustrating the operation of the light-emitting chip in the odd-even mode as odd-even full light-emitting operation.

FIG. 14 is a timing chart for illustrating the operation of the light-emitting chip C in the case of causing the 130 pairs of the light-emitting thyristors L, thus all the light-emitting thyristors L1 to L260, to emit light in the odd-even mode (the case will be referred to as odd-even full light-emitting operation).

Figure 15:
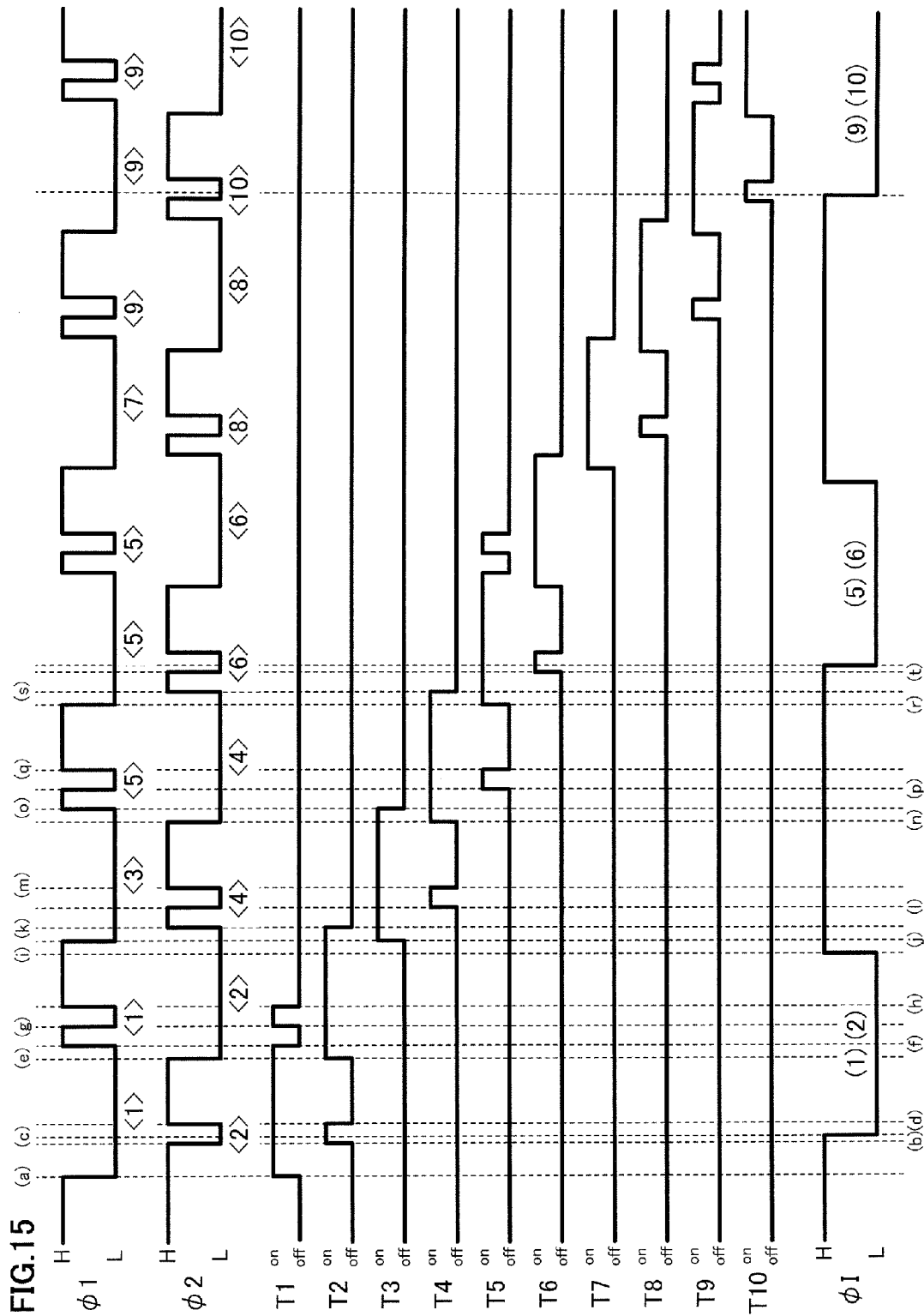
FIG. 15 is a timing chart for illustrating the operation of the light-emitting chip in the odd-even mode as odd-even alternate light-emitting operation.

On the other hand, FIG. 15 is a timing chart for illustrating the operation of the light-emitting chip C in the case of causing every other pair, thus 65 pairs in total, of the light-emitting thyristors L, that is, the light-emitting thyristors L1 and L2, L5 and L6, L9 and L10, . . . , to emit light in the odd-even mode (the case will be referred to as odd-even alternate light-emitting operation).

Note that, among all the light-emitting thyristors L1 to L260, FIGS. 14 and 15 show the operations of only the light-emitting thyristors L1 to L10, and thus do not show the operations of the more downstream light-emitting thyristors L11 to L260.

Figure 16:
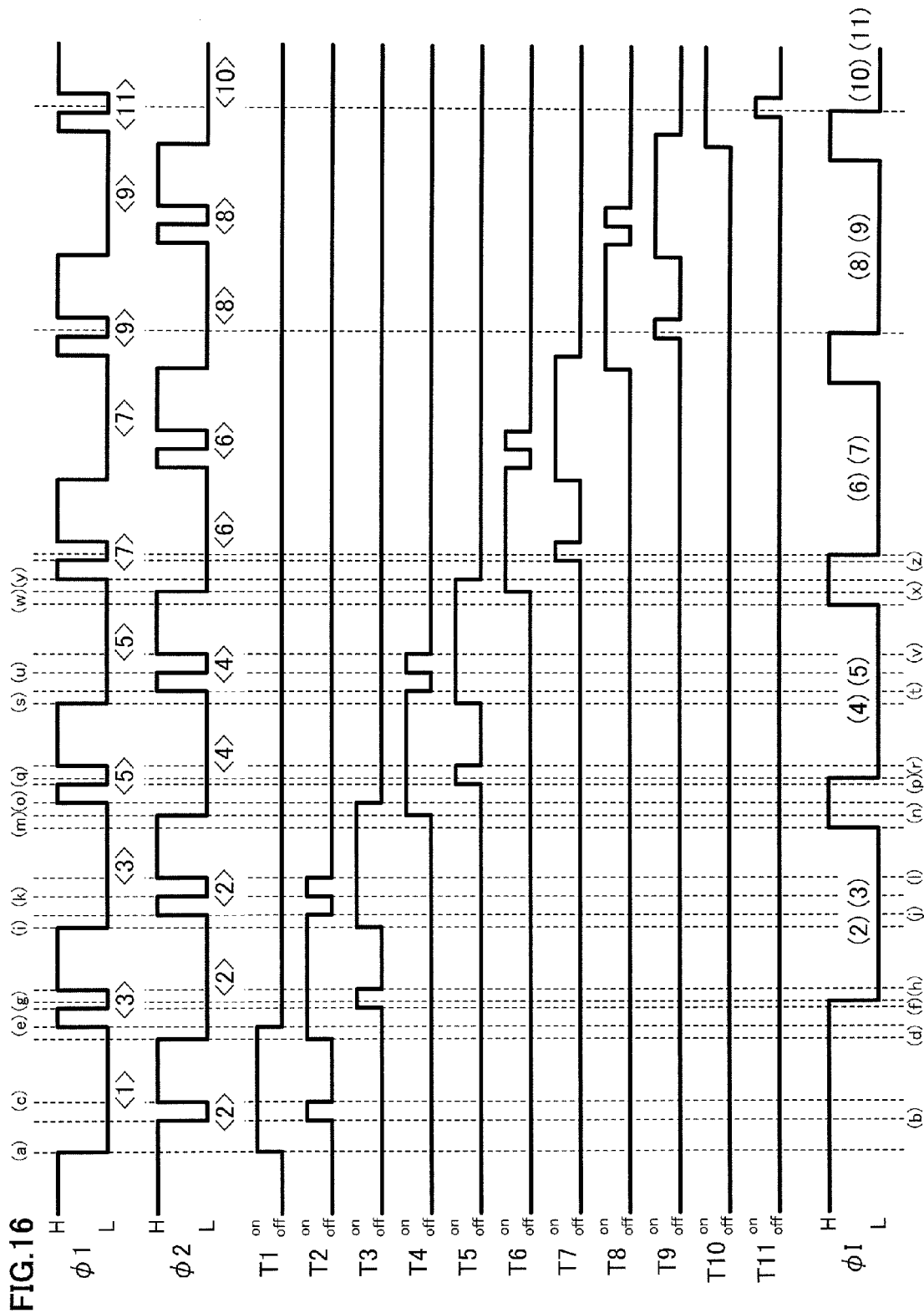
FIG. 16 is a timing chart for illustrating the operation of the light-emitting chip in the even-odd mode as even-odd full light-emitting operation.

Meanwhile, FIG. 16 is a timing chart for illustrating the operation of the light-emitting chip C in the case of causing the 129 pairs of the light-emitting thyristors L except the endmost ones, thus the light-emitting thyristors L2 to L259, to emit light in the even-odd mode (the case will be referred to as even-odd full light-emitting operation).

On the other hand, FIG. 17 is a timing chart for illustrating the operation of the light-emitting chip C in the case of causing every other pair, thus 64 pairs in total, of the light-emitting thyristors L, that is, the light-emitting thyristors L2 and L3, L6 and L7, L10 and L11, ..., to emit light in the even-odd mode (the case will be referred to as even-odd alternate light-emitting operation).

Note that, among all the light-emitting thyristors L1 to L260, FIGS. 16 and 17 show the operations of only the light-emitting thyristors L1 to L11, and thus do not show the operations of the more downstream light-emitting thyristors L12 to L260.

As shown in FIGS. 14 to 17, in the initial state, the first and second transfer signals φ1 and φ2, and the light-emission signal φI for the light-emitting chip C are all set to the high level (H). In addition, in the initial state, the transfer thyristors T1 to T260 and the light-emitting thyristors L1 to L260 constituting the light-emitting chip C are all turned off.

Note that <X> in FIGS. 14 to 17 indicates the transfer thyristor being currently turned on. Specifically, <1> indicates the period during which the transfer thyristor T1 is turned on, for example. Meanwhile, (Y) in FIGS. 14 to 17 indicates the light-emitting thyristor being currently turned on to emit light. Specifically, (1) indicates the period during which the light-emitting thyristor L1 emits light, for example. However, in the present exemplary embodiment, two adjacent light-emitting thyristors in each light-emitting chip C simultaneously emit light, and thus (1) (2) indicates one period, for example.

<<Odd-even Mode>>
(Odd-even Full Light-emitting Operation)

Firstly, with reference to FIG. 6 and the timing chart shown in FIG. 14, the odd-even full light-emitting operation will be described.

In the initial state, the second transfer signal φ2 of high level is supplied to the gate terminal G1 of the transfer thyristor T1 via the start diode Ds in the light-emitting chip C. At the same time, the second transfer signal φ2 is also supplied to the gate terminals G2 to G260 of the other transfer thyristors T2 to T260 via the connection diodes D1 to D259. However, among the gate terminals G1 to G260, the highest voltage is applied to the gate terminal G1 of the transfer thyristor T1 since each of the connection diodes D1 to D260 causes a voltage drop.

Then, the first transfer signal φ1 is switched from the high level to the low level (L) in the state where the second transfer signal φ2 remains at the high level ((a) in FIG. 14). In the light-emitting chip C supplied with the first transfer signal φ1 of low level in the state where the second transfer signal φ2 is set to the high level, the transfer thyristor T1, which has the highest gate voltage not lower than a threshold voltage, gets turned on among the odd-numbered transfer thyristors T1, T3, ..., T259 that are supplied with the first transfer signal φ1 of low level. Meanwhile, since the second transfer signal φ2 is set to the high level, the even-numbered transfer thyristors T2, T4, ..., T260 are kept to have high cathode voltages, and thus kept turned off. As a result, only the odd-numbered transfer thyristor T1 is turned on in the light-emitting chip C.

Then, the second transfer signal φ2 is switched from the high level to the low level in the state where the transfer thyristor T1 is turned on ((b) in FIG. 14). In response, among the even-numbered transfer thyristors T2, T4, ..., T260 that are supplied with the second transfer signal φ2 of low level, the transfer thyristor T2, which has the highest gate voltage not lower than the threshold voltage, gets turned on. At this time, the odd-numbered transfer thyristor T1 and the even-numbered transfer thyristor T2 adjacent thereto are both turned on in the light-emitting chip C.

Then, the light-emission signal φI is switched from the high level to the low level in the state where the transfer thyristors T1 and T2 are both turned on ((c) in FIG. 14). In response, the odd-numbered light-emitting thyristor L1 and the even-numbered light-emitting thyristor L2 adjacent thereto are both turned on to start emitting light.

After that, the second transfer signal φ2 is switched from the low level to the high level in the state where the transfer thyristors T1 and T2 are both turned on and the light-emitting thyristors L1 and L2 are both turned on, that is, the light-emitting thyristors L1 and L2 emit light ((d) in FIG. 14). In response, the transfer thyristor T2 transitions from the on state to the off state while the transfer thyristor T1 is kept turned on. However, because of inherent properties of a thyristor, once turned on, the light-emitting thyristor L2 does not get turned off but continues to emit light even if the transfer thyristor T2 gets turned off. Accordingly, still at this time point (d), the light-emitting thyristors L1 and L2 both continue to emit light.

Then, the second transfer signal φ2 is switched from the high level to the low level again in the state where the transfer thyristor T1 is kept turned on, the transfer thyristor T2 is turned off and the light-emitting thyristors L1 and L2 are both turned on, that is, the light-emitting thyristors L1 and L2 emit light ((e) in FIG. 14). In response, among the even-numbered transfer thyristors T2, T4, ..., T260 that are supplied with the second transfer signal φ2 of low level, the transfer thyristor T2, whose gate terminal is connected to that of the light-emitting thyristor L2 currently emitting light, gets turned on again. At this time, the odd-numbered transfer thyristor T1 and the even-numbered transfer thyristor T2 adjacent thereto are both turned on in the light-emitting chip C. Still at this time point (e), the light-emitting thyristors L1 and L2 both continue to emit light.

After that, the first transfer signal φ1 is switched from the low level to the high level in the state where the transfer thyristors T1 and T2 are both turned on and the light-emitting thyristors L1 and L2 are both turned on, that is, the light-emitting thyristors L1 and L2 emit light ((f) in FIG. 14). In response, the transfer thyristor T1 transitions from the on state to the off state while the transfer thyristor T2 is kept turned on. However, because of the inherent properties of a thyristor, once turned on, the light-emitting thyristor L1 does not get turned off but continues to emit light even if the transfer thyristor T1 gets turned off. Accordingly, still at this time point (f), the light-emitting thyristors L1 and L2 both continue to emit light.

Then, the first transfer signal φ1 is switched from the high level to the low level again in the state where the transfer thyristor T2 is kept turned on, the transfer thyristor T1 is turned off and the light-emitting thyristors L1 and L2 both emit light ((g) in FIG. 14). In response, among the odd-numbered transfer thyristors T1, T3, ..., T259 that are supplied with the first transfer signal φ1 of low level, the transfer thyristor T1, whose gate terminal is connected to that of the light-emitting thyristor L1 currently emitting light, gets turned on again. At this time, the odd-numbered transfer thyristor T1 and the even-numbered transfer thyristor T2 adjacent thereto are both turned on in the light-emitting chip C. Still at this time point (g), the light-emitting thyristors L1 and L2 both continue to emit light.

After that, the first transfer signal φ1 is switched from the low level to the high level again in the state where the transfer thyristors T1 and T2 are both turned on and the light-emitting thyristors L1 and L2 both emit light ((h) in FIG. 14). In response, the transfer thyristor T1 transitions from the on state to the off state while the transfer thyristor T2 is kept turned on. However, because of the inherent properties of a thyristor, once turned on, the light-emitting thyristor L1 does not get turned off but continues to emit light even if the transfer thyristor T1 gets turned off. Accordingly, still at this time point (h), the light-emitting thyristors L1 and L2 both continue to emit light.

Then, the light-emission signal ϕI is switched from the low level to the high level in the state where the transfer thyristor T2 is kept turned on, the transfer thyristor T1 is turned off and the light-emitting thyristors L1 and L2 both emit light ((i) in FIG. 14). In response, the light-emitting thyristors L1 and L2 both stop emitting light, and thus emit no light after that.

Subsequently, the first transfer signal ϕ1 is switched from the high level to the low level in the state where the transfer thyristor T2 is kept turned on, the transfer thyristor T1 is kept turned off and the light-emitting thyristors L1 and L2 both stop emitting light ((j) in FIG. 14). In response, among the odd-numbered transfer thyristors T1, T3, ..., T259 that are supplied with the first transfer signal ϕ1 of low level, the transfer thyristor T3, which has the highest gate voltage not lower than the threshold voltage, gets turned on. Note that the gate voltage of the transfer thyristor T1, which is upstream from the transfer thyristor T3, has dropped in response to stop of light emission of the light-emitting thyristor L1 whose gate terminal is connected to that of the transfer thyristor T1, and thus is lower than that of the transfer thyristor T3 at this time point (j). At this time, the even-numbered transfer thyristor T2 and the odd-numbered transfer thyristor T3 adjacent thereto are both turned on in the light-emitting chip C.

However, in the odd-even mode, an odd-numbered light-emitting thyristor and an even-numbered light-emitting thyristor next thereto are used as a pair to emit light at a time. Accordingly, the light-emission signal ϕI is never switched from the high level to the low level in this state.

Then, the second transfer signal ϕ2 is switched from the low level to the high level in the state where the transfer thyristors T2 and T3 are both turned on ((k) in FIG. 14). In response, the transfer thyristor T2 transitions from the on state to the off state while the transfer thyristor T3 is kept turned on.

Then, the second transfer signal ϕ2 is switched from the high level to the low level in the state where the transfer thyristor T3 is turned on ((l) in FIG. 14). In response, among the even-numbered transfer thyristors T2, T4, ..., T260 that are supplied with the second transfer signal ϕ2 of low level, the transfer thyristor T4, which has the highest gate voltage not lower than the threshold voltage, gets turned on. Note that the gate voltage of the transfer thyristor T2, which is upstream from the transfer thyristor T4, has dropped in response to stop of light emission of the light-emitting thyristor L2 whose gate terminal is connected to that of the transfer thyristor T2, and thus is lower than that of the transfer thyristor T4 at this time point (l). At this time, the odd-numbered transfer thyristor T3 and the even-numbered transfer thyristor T4 adjacent thereto are both turned on in the light-emitting chip C.

Then, the light-emission signal ϕI is switched from the high level to the low level in the state where the transfer thyristors T3 and T4 are both turned on ((m) in FIG. 14). In response, the odd-numbered light-emitting thyristor L3 and the even-numbered light-emitting thyristor L4 adjacent thereto are both turned on to start emitting light.

After that, the second transfer signal ϕ2 is switched from the low level to the high level in the state where the transfer thyristors T3 and T4 are both turned on and the light-emitting thyristors L3 and L4 are both turned on, that is, the light-emitting thyristors L3 and L4 emit light ((n) in FIG. 14). In response, the transfer thyristor T4 transitions from the on state to the off state while the transfer thyristor T3 is kept turned on. However, because of the inherent properties of a thyristor, once turned on, the light-emitting thyristor L4 does not get turned off but continues to emit light even if the transfer thyristor T4 gets turned off. Accordingly, still at this time point (n), the light-emitting thyristors L3 and L4 both continue to emit light.

Then, the second transfer signal ϕ2 is switched from the high level to the low level again in the state where the transfer thyristor T3 is kept turned on, the transfer thyristor T4 is turned off and the light-emitting thyristors L3 and L4 are both turned on, that is, the light-emitting thyristors L3 and L4 emit light ((o) in FIG. 14). In response, among the even-numbered transfer thyristors T2, T4, ..., T260 that are supplied with the second transfer signal ϕ2 of low level, the transfer thyristor T4, whose gate terminal is connected to that of the light-emitting thyristor L4 currently emitting light, gets turned on again. At this time, the odd-numbered transfer thyristor T3 and the even-numbered transfer thyristor T4 adjacent thereto are both turned on in the light-emitting chip C. Still at this time point (o), the light-emitting thyristors L3 and L4 both continue to emit light.

After that, the first transfer signal ϕ1 is switched from the low level to the high level in the state where the transfer thyristors T3 and T4 are both turned on and the light-emitting thyristors L3 and L4 are both turned on, that is, the light-emitting thyristors L3 and L4 emit light ((p) in FIG. 14). In response, the transfer thyristor T3 transitions from the on state to the off state while the transfer thyristor T4 is kept turned on. However, because of the inherent properties of a thyristor, once turned on, the light-emitting thyristor L3 does not get turned off but continues to emit light even if the transfer thyristor T3 gets turned off. Accordingly, still at this time point (p), the light-emitting thyristors L3 and L4 both continue to emit light.

Then, the first transfer signal ϕ1 is switched from the high level to the low level again in the state where the transfer thyristor T4 is kept turned on, the transfer thyristor T3 is turned off and the light-emitting thyristors L3 and L4 both emit light ((q) in FIG. 14). In response, among the odd-numbered transfer thyristors T1, T3, ..., T259 that are supplied with the first transfer signal ϕ1 of low level, the transfer thyristor T3, whose gate terminal is connected to that of the light-emitting thyristor L3 currently emitting light, gets turned on again. At this time, the odd-numbered transfer thyristor T3 and the even-numbered transfer thyristor T4 adjacent thereto are both turned on in the light-emitting chip C. Still at this time point (q), the light-emitting thyristors L3 and L4 both continue to emit light.

After that, the first transfer signal ϕ1 is switched from the low level to the high level again in the state where the transfer thyristors T3 and T4 are both turned on and the light-emitting thyristors L3 and L4 both emit light ((r) in FIG. 14). In response, the transfer thyristor T3 transitions from the on state to the off state while the transfer thyristor T4 is kept turned on. However, because of the inherent properties of a thyristor, once turned on, the light-emitting thyristor L3 does not get turned off but continues to emit light even if the transfer thyristor T3 gets turned off. Accordingly, still at this time point (r), the light-emitting thyristors L3 and L4 both continue to emit light.

Then, the light-emission signal ϕI is switched from the low level to the high level in the state where the transfer thyristor T4 is kept turned on, the transfer thyristor T3 is turned off and the light-emitting thyristors L3 and L4 both emit light ((s) in FIG. 14). In response, the light-emitting thyristors L3 and L4 both stop emitting light, and thus emit no light after that.

Subsequently, the first transfer signal ϕ1 is switched from the high level to the low level in the state where the transfer thyristor T4 is kept turned on, the transfer thyristor T3 is kept turned off and the light-emitting thyristors L3 and L4 both stop emitting light ((t) in FIG. 14). In response, among the odd-numbered transfer thyristors T1, T3, . . . , T259 that are supplied with the first transfer signal φ1 of low level, the transfer thyristor T5, which has the highest gate voltage not lower than the threshold voltage, gets turned on. Note that the gate voltage of the transfer thyristor T3, which is upstream from the transfer thyristor T5, has dropped in response to stop of light emission of the light-emitting thyristor L3 whose gate terminal is connected to that of the transfer thyristor T3, and thus is lower than that of the transfer thyristor T5 at this time point (t). At this time, the even-numbered transfer thyristor T4 and the odd-numbered transfer thyristor T5 adjacent thereto are both turned on in the light-emitting chip C.

However, in the odd-even mode, an odd-numbered light-emitting thyristor and an even-numbered light-emitting thyristor next thereto are used as a pair to emit light at a time. Accordingly, the light-emission signal φI is never switched from the high level to the low level in this state.

Then, the second transfer signal φ2 is switched from the low level to the high level in the state where the transfer thyristors T4 and T5 are both turned on ((u) in FIG. 14). In response, the transfer thyristor T4 transitions from the on state to the off state while the transfer thyristor T5 is kept turned on.

Then, the second transfer signal φ2 is switched from the high level to the low level in the state where the transfer thyristor T5 is turned on ((v) in FIG. 14). In response, among the even-numbered transfer thyristors T2, T4, . . . , T260 that are supplied with the second transfer signal φ2 of low level, the transfer thyristor T6, which has the highest gate voltage not lower than the threshold voltage, gets turned on. Note that the gate voltage of the transfer thyristor T4, which is upstream from the transfer thyristor T6, has dropped in response to stop of light emission of the light-emitting thyristor L4 whose gate terminal is connected to that of the transfer thyristor T4, and thus is lower than that of the transfer thyristor T6 at this time point (v). At this time, the odd-numbered transfer thyristor T5 and the even-numbered transfer thyristor T6 adjacent thereto are both turned on in the light-emitting chip C.

Note that, in this example, the period from (b) to (d) and period from (l) to (n) in FIG. 14 are each equivalent to the third period Tc in FIG. 12. Meanwhile, the period from (h) to (j) and period from (r) to (t) in FIG. 14 are each equivalent to the eighth period Th in FIG. 12.

The same procedure is followed for the operations of the subsequent light-emitting thyristors. Specifically, the light-emission signal φI is switched from the high level to the low level in the third period Tc and in the state where an odd-numbered transfer thyristor and an even-numbered transfer thyristor downstream therefrom and adjacent thereto are both turned on. This causes an odd-numbered light-emitting thyristor and an even-numbered light-emitting thyristor downstream therefrom and adjacent thereto, whose gate terminals are respectively connected to those of the odd-numbered transfer thyristor and the even-numbered transfer thyristor, to both emit light. After that, the light-emission signal φI is switched from the low level to the high level in the eighth period Th and in the state where only the even-numbered transfer thyristor is turned on. This causes the odd-numbered light-emitting thyristor and the even-numbered light-emitting thyristor downstream therefrom and adjacent thereto to both stop emitting light. In this eighth period Th, only the even-numbered transfer thyristor, which is downstream from the paired odd-numbered transfer thyristor, is turned on, so that an odd-numbered transfer thyristor downstream from and adjacent to this even-numbered transfer thyristor is to be turned on next. In this way, normal transfer is maintained.

(Odd-even Alternate Light-emitting Operation)

Secondly, with reference to FIG. 6 and the timing chart shown in FIG. 15, the odd-even alternate light-emitting operation will be described.

Here, the process from (a) to (l) in FIG. 15 is exactly the same as that from (a) to (l) in FIG. 14 in the foregoing odd-even full light-emitting operation. Accordingly, the detailed description thereof will be omitted, and thus the odd-even alternate light-emitting operation will be described from (l) in FIG. 15.

In a state where the transfer thyristor T3 is turned on after a series of the time points (a) to (k) in FIG. 15, the second transfer signal φ2 is switched from the high level to the low level ((l) in FIG. 15). In response, among the even-numbered transfer thyristors T2, T4, . . . , T260 that are supplied with the second transfer signal φ2 of low level, the transfer thyristor T4, which has the highest gate voltage not lower than the threshold voltage, gets turned on. Note that the gate voltage of the transfer thyristor T2, which is upstream from the transfer thyristor T4, has dropped in response to stop of light emission of the light-emitting thyristor L2 whose gate terminal is connected to that of the transfer thyristor T2, and thus is lower than that of the transfer thyristor T4 at this time point (l). At this time, the odd-numbered transfer thyristor T3 and the even-numbered transfer thyristor T4 adjacent thereto are both turned on in the light-emitting chip C.

However, in the odd-even alternate light-emitting operation, the light-emitting thyristors L3 and L4 are caused to emit no light. Accordingly, the light-emission signal φI is never switched from the high level to the low level in the state where the transfer thyristors T3 and T4 are both turned on.

After that, the second transfer signal φ2 is switched from the low level to the high level in the state where the transfer thyristors T3 and T4 are both turned on and the light-emitting thyristors L3 and L4 both emit no light ((m) in FIG. 15). In response, the transfer thyristor T4 transitions from the on state to the off state while the transfer thyristor T3 is kept turned on. Meanwhile, the light-emitting thyristors L3 and L4 both continue to emit no light.

Then, the second transfer signal φ2 is switched from the high level to the low level again in the state where the transfer thyristor T3 is kept turned on, the transfer thyristor T4 is turned off and the light-emitting thyristors L3 and L4 are both turned off, that is, the light-emitting thyristors L3 and L4 emit no light ((n) in FIG. 15). In response, among the even-numbered transfer thyristors T2, T4, . . . , T260 that are supplied with the second transfer signal φ2 of low level, the transfer thyristor T4, which has the highest gate voltage not lower than the threshold voltage, gets turned on again. As a result, the odd-numbered transfer thyristor T3 and the even-numbered transfer thyristor T4 adjacent thereto are both turned on in the light-emitting chip C. Still at this time point (n), the light-emitting thyristors L3 and L4 both continue to emit no light.

After that, the first transfer signal φ1 is switched from the low level to the high level in the state where the transfer thyristors T3 and T4 are both turned on and the light-emitting thyristors L3 and L4 both emit no light ((o) in FIG. 15). In response, the transfer thyristor T3 transitions from the on state to the off state while the transfer thyristor T4 is kept turned on. Still at this time point (o), the light-emitting thyristors L3 and L4 both continue to emit no light.

Then, the first transfer signal φ1 is switched from the high level to the low level in the state where the transfer thyristor T4 is kept turned on, the transfer thyristor T3 is turned off and the light-emitting thyristors L3 and L4 both emit no light ((p)

in FIG. 15). In response, among the odd-numbered transfer thyristors T1, T3, ..., T259 that are supplied with the first transfer signal φ1 of low level, the transfer thyristor T5, which has the highest gate voltage not lower than the threshold voltage, gets turned on. The reason why the transfer thyristor T5 gets turned on at this time point, unlike the example shown in FIG. 14, is as follows. At this time point (p), the light-emitting thyristor L3 emits no light, and thus the gate voltage of the transfer thyristor T3, whose gate terminal is connected to that of the light-emitting thyristor L3, is lower than that of the transfer thyristor T5. As a result, the even-numbered transfer thyristor T4 and the odd-numbered transfer thyristor T5 adjacent thereto are both turned on in the light-emitting chip C.

However, in the odd-even mode, an odd-numbered light-emitting thyristor and an even-numbered light-emitting thyristor next thereto are used as a pair to emit light at a time. Accordingly, the light-emission signal φI is never switched from the high level to the low level in this state.

Then, the first transfer signal φ1 is switched from the low level to the high level in the state where the transfer thyristors T4 and T5 are both turned on ((q) in FIG. 15). In response, the transfer thyristor T5 transitions from the on state to the off state while the transfer thyristor T4 is kept turned on.

Then, the first transfer signal φ1 is switched from the high level to the low level again in the state where the transfer thyristor T4 is kept turned on and the transfer thyristor T5 is turned off ((r) in FIG. 15). In response, among the odd-numbered transfer thyristors T1, T3, ..., T259 that are supplied with the first transfer signal φ1 of low level, the transfer thyristor T5, which has the highest gate voltage not lower than the threshold voltage, gets turned on again. At this time, the even-numbered transfer thyristor T4 and the odd-numbered transfer thyristor T5 adjacent thereto are both turned on in the light-emitting chip C.

Then, the second transfer signal φ2 is switched from the low level to the high level in the state where the transfer thyristors T4 and T5 are both turned on ((s) in FIG. 15). In response, the transfer thyristor T4 transitions from the on state to the off state while the transfer thyristor T5 is kept turned on.

Then, the second transfer signal φ2 is switched from the high level to the low level in the state where the transfer thyristor T5 is turned on ((t) in FIG. 15). In response, among the even-numbered transfer thyristors T2, T4, ..., T260 that are supplied with the second transfer signal φ2 of low level, the transfer thyristor T6, which has the highest gate voltage not lower than the threshold voltage, gets turned on. At this time, the odd-numbered transfer thyristor T5 and the even-numbered transfer thyristor T6 adjacent thereto are both turned on in the light-emitting chip C.

Note that, in this example, the period from (b) to (d) and period from (l) to (m) in FIG. 15 are each equivalent to the third period Tc in FIG. 12. Meanwhile, the period from (h) to (j) and period from (q) to (r) in FIG. 15 are each equivalent to the eighth period Th in FIG. 12.

The same procedure is followed for the operations of the subsequent light-emitting thyristors. Specifically, the light-emission signal φI is switched from the high level to the low level in the third period Tc and in the state where an odd-numbered transfer thyristor and an even-numbered transfer thyristor downstream therefrom and adjacent thereto, which are assigned any pair of (1, 2), (5, 6), (9, 10), are both turned on. This causes an odd-numbered (1, 5, 9, ...) light-emitting thyristor and an even-numbered (2, 6, 10, ...) light-emitting thyristor downstream therefrom and adjacent thereto, whose gate terminals are respectively connected to those of the odd-numbered (1, 5, 9, ...) transfer thyristor and the even-numbered (2, 6, 10, ...) transfer thyristor, to both emit light. After that, the light-emission signal φI is switched from the low level to the high level in the eighth period Th and in the state where only the even-numbered (2, 6, 10, ...) transfer thyristor is turned on. This causes the odd-numbered (1, 5, 9, ...) light-emitting thyristor and the even-numbered (2, 6, 10, ...) light-emitting thyristor downstream therefrom and adjacent thereto to both stop emitting light. In this eighth period Th, only the even-numbered transfer thyristor, which is downstream from the paired odd-numbered transfer thyristor, is turned on, so that an odd-numbered transfer thyristor downstream from and adjacent to this even-numbered transfer thyristor is to be turned on next. In this way, normal transfer is maintained.

On the other hand, in this example, the light-emission signal φI is kept at the high level in the third period Tc, and in the state where an odd-numbered transfer thyristor and an even-numbered transfer thyristor downstream therefrom and adjacent thereto, which are assigned any pair of (3, 4), (7, 8), ..., are both turned on. This causes an odd-numbered (3, 7, ...) light-emitting thyristor and an even-numbered (4, 8, ...) light-emitting thyristor downstream therefrom and adjacent thereto, whose gate terminals are respectively connected to those of the odd-numbered (3, 7, ...) transfer thyristor and the even-numbered (4, 8, ...) transfer thyristor, to both emit no light. However, in this case as well, in the eighth period Th, only the even-numbered transfer thyristor, which is downstream from the paired odd-numbered transfer thyristor, is turned on, so that an odd-numbered transfer thyristor downstream from and adjacent to this even-numbered transfer thyristor is to be turned on next. In this way, normal transfer is maintained.

<<Even-odd Mode>>

(Even-odd Full Light-emitting Operation)

Next, with reference to FIG. 6 and the timing chart shown in FIG. 16, the odd-even full light-emitting operation will be described.

In the initial state, the transfer signal generating unit 120 of the signal generating circuit 100 supplies the second transfer signal φ2 of high level to the gate terminal G1 of the transfer thyristor T1 via the start diode Ds in the light-emitting chip C. At the same time, the second transfer signal φ2 is also supplied to the gate terminals G2 to G260 of the other transfer thyristors T2 to T260 via the connection diodes D1 to D259. However, the highest voltage is applied to the gate terminal G1 of the transfer thyristor T1 since each of the connection diodes D1 to D260 causes a voltage drop.

Then, the first transfer signal φ1 is switched from the high level to the low level (L) in the state where the second transfer signal φ2 remains at the high level ((a) in FIG. 16). In the light-emitting chip C, the first transfer signal φ1 of low level is supplied in the state where the second transfer signal φ2 is set to the high level, and thus the transfer thyristor T1, which has the highest gate voltage not lower than the threshold voltage, gets turned on among the odd-numbered transfer thyristors T1, T3, ..., T259 that are supplied with the first transfer signal φ1 of low level. Meanwhile, since the second transfer signal φ2 is set to the high level, the even-numbered transfer thyristors T2, T4, ..., T260 are kept to have high cathode voltages, and thus kept turned off. As a result, only the odd-numbered transfer thyristor T1 is turned on in the light-emitting chip C.

Then, the second transfer signal φ2 is switched from the high level to the low level in the state where the transfer thyristor T1 is turned on ((b) in FIG. 16). In response, among the even-numbered transfer thyristors T2, T4, ..., T260 that are supplied with the second transfer signal φ2 of low level, the transfer thyristor T2, which has the highest gate voltage not lower than the threshold voltage, gets turned on. At this time, the odd-numbered transfer thyristor T1 and the even-numbered transfer thyristor T2 adjacent thereto are both turned on in the light-emitting chip C.

However, in the even-odd mode, the light-emitting thyristor L1 is caused to emit no light. Accordingly, the light-emission signal φI is never switched from the high level to the low level in the state where the transfer thyristors T1 and T2 are both turned on.

After that, the second transfer signal φ2 is switched from the low level to the high level in the state where the transfer thyristors T1 and T2 are both turned on and the light-emitting thyristors L1 and L2 both emit no light ((c) in FIG. 16). In response, the transfer thyristor T2 transitions from the on state to the off state while the transfer thyristor T1 is kept turned on. Meanwhile, the light-emitting thyristors L1 and L2 both continue to emit no light.

Then, the second transfer signal φ2 is switched from the high level to the low level again in the state where the transfer thyristor T1 is kept turned on, the transfer thyristor T2 is turned off and the light-emitting thyristors L1 and L2 both emit no light ((d) in FIG. 16). In response, among the even-numbered transfer thyristors T2, T4, . . . , T260 that are supplied with the second transfer signal φ2 of low level, the transfer thyristor T2, which has the highest gate voltage not lower than the threshold voltage, gets turned on again. As a result, the odd-numbered transfer thyristor T1 and the even-numbered transfer thyristor T2 adjacent thereto are both turned on in the light-emitting chip C. Still at this time point (d), the light-emitting thyristors L1 and L2 both continue to emit no light.

After that, the first transfer signal φ1 is switched from the low level to the high level in the state where the transfer thyristors T1 and T2 are both turned on and the light-emitting thyristors L1 and L2 both emit no light ((e) in FIG. 16). In response, the transfer thyristor T1 transitions from the on state to the off state while the transfer thyristor T2 is kept turned on. Still at this time point (e), the light-emitting thyristors L1 and L2 both continue to emit no light.

Then, the first transfer signal φ1 is switched from the high level to the low level again in the state where the transfer thyristor T2 is kept turned on, the transfer thyristor T1 is turned off and the light-emitting thyristors L1 and L2 both emit no light ((f) in FIG. 16). In response, among the odd-numbered transfer thyristors T1, T3, . . . , T259 that are supplied with the first transfer signal φ1 of low level, the transfer thyristor T3, which has the highest gate voltage not lower than the threshold voltage, gets turned on. As a result, the even-numbered transfer thyristor T2 and the odd-numbered transfer thyristor T3 adjacent thereto are both turned on in the light-emitting chip C.

Then, the light-emission signal φI is switched from the high level to the low level in the state where the transfer thyristors T2 and T3 are both turned on ((g) in FIG. 16). In response, the even-numbered light-emitting thyristor L2 and the odd-numbered light-emitting thyristor L3 adjacent thereto are both turned on to start emitting light.

After that, the first transfer signal φ1 is switched from the low level to the high level in the state where the transfer thyristors T2 and T3 are both turned on and the light-emitting thyristors L2 and L3 are both turned on, that is, the light-emitting thyristors L2 and L3 emit light ((h) in FIG. 16). In response, the transfer thyristor T3 transitions from the on state to the off state while the transfer thyristor T2 is kept turned on. However, because of the inherent properties of a thyristor, once turned on, the light-emitting thyristor L3 does not get turned off but continues to emit light even if the transfer thyristor T3 gets turned off. Accordingly, still at this time point (h), the light-emitting thyristors L2 and L3 both continue to emit light.

Then, the first transfer signal φ1 is switched from the high level to the low level again in the state where the transfer thyristor T2 is kept turned on, the transfer thyristor T3 is turned off and the light-emitting thyristors L2 and L3 are both turned on, that is, the light-emitting thyristors L2 and L3 emit light ((i) in FIG. 16). In response, among the odd-numbered transfer thyristors T1, T3, . . . , T259 that are supplied with the first transfer signal φ1 of low level, the transfer thyristor T3, whose gate terminal is connected to that of the light-emitting thyristor L3 currently emitting light, gets turned on again. At this time, the even-numbered transfer thyristor T2 and the odd-numbered transfer thyristor T3 adjacent thereto are both turned on in the light-emitting chip C. Still at this time point (i), the light-emitting thyristors L2 and L3 both continue to emit light.

After that, the second transfer signal φ2 is switched from the low level to the high level in the state where the transfer thyristors T2 and T3 are both turned on and the light-emitting thyristors L2 and L3 are both turned on, that is, the light-emitting thyristors L2 and L3 emit light ((j) in FIG. 16). In response, the transfer thyristor T2 transitions from the on state to the off state while the transfer thyristor T3 is kept turned on. However, because of the inherent properties of a thyristor, once turned on, the light-emitting thyristor L2 does not get turned off but continues to emit light even if the transfer thyristor T2 gets turned off. Accordingly, still at this time point (j), the light-emitting thyristors L2 and L3 both continue to emit light.

Then, the second transfer signal φ2 is switched from the high level to the low level again in the state where the transfer thyristor T3 is kept turned on, the transfer thyristor T2 is turned off and the light-emitting thyristors L2 and L3 are both turned on, that is, the light-emitting thyristors L2 and L3 emit light ((k) in FIG. 16). In response, among the even-numbered transfer thyristors T2, T4, . . . , T260 that are supplied with the second transfer signal φ2 of low level, the transfer thyristor T2, whose gate terminal is connected to that of the light-emitting thyristor L2 currently emitting light, gets turned on again. At this time, the even-numbered transfer thyristor T2 and the odd-numbered transfer thyristor T3 adjacent thereto are both turned on in the light-emitting chip C. Still at this time point (k), the light-emitting thyristors L2 and L3 both continue to emit light.

After that, the second transfer signal φ2 is switched from the low level to the high level again in the state where the transfer thyristors T2 and T3 are both turned on and the light-emitting thyristors L2 and L3 are both turned on, that is, the light-emitting thyristors L2 and L3 emit light ((l) in FIG. 16). In response, the transfer thyristor T2 transitions from the on state to the off state while the transfer thyristor T3 is kept turned on. However, because of inherent properties of a thyristor, once turned on, the light-emitting thyristor L2 does not get turned off but continues to emit light even if the transfer thyristor T2 gets turned off. Accordingly, still at this time point (l), the light-emitting thyristors L2 and L3 both continue to emit light.

Then, the light-emission signal φI is switched from the low level to the high level in the state where the transfer thyristor T3 is kept turned on, the transfer thyristor T2 is turned off, and the light-emitting thyristors L2 and L3 are both turned on, that is, the light-emitting thyristors L2 and L3 emit light ((m) in FIG. 16). In response, the light-emitting thyristors L2 and L3 both stop emitting light, and thus emit no light after that.

Subsequently, the second transfer signal φ2 is switched from the high level to the low level in the state where the transfer thyristor T3 is kept turned on, the transfer thyristor T2 is kept turned off and the light-emitting thyristors L2 and L3 both stop emitting light ((n) in FIG. 16). In response, among the even-numbered transfer thyristors T2, T4, ..., T260 that are supplied with the second transfer signal φ2 of low level, the transfer thyristor T4, which has the highest gate voltage not lower than the threshold voltage, gets turned on. Note that the gate voltage of the transfer thyristor T2, which is upstream from the transfer thyristor T4, has dropped in response to stop of light emission of the light-emitting thyristor L2 whose gate terminal is connected to that of the transfer thyristor T2, and thus is lower than that of the transfer thyristor T4 at this time point (n). At this time, the odd-numbered transfer thyristor T3 and the even-numbered transfer thyristor T4 adjacent thereto are both turned on in the light-emitting chip C.

However, in the even-odd mode, an even-numbered light-emitting thyristor and an odd-numbered light-emitting thyristor next thereto are used as a pair to emit light at a time. Accordingly, the light-emission signal φI is never switched from the high level to the low level in this state.

Then, the first transfer signal φ1 is switched from the low level to the high level in the state where the transfer thyristors T3 and T4 are both turned on ((o) in FIG. 16). In response, the transfer thyristor T3 transitions from the on state to the off state while the transfer thyristor T4 is kept turned on.

Then, the first transfer signal φ1 is switched from the high level to the low level in the state where the transfer thyristor T4 is turned on ((p) in FIG. 16). In response, among the odd-numbered transfer thyristors T1, T3, ..., T259 that are supplied with the first transfer signal φ1 of low level, the transfer thyristor T5, which has the highest gate voltage not lower than the threshold voltage, gets turned on. Note that the gate voltage of the transfer thyristor T3, which is upstream from the transfer thyristor T5, has dropped in response to stop of light emission of the light-emitting thyristor L3 whose gate terminal is connected to that of the transfer thyristor T3, and thus is lower than that of the transfer thyristor T5 at this time point (p). At this time, the even-numbered transfer thyristor T4 and the odd-numbered transfer thyristor T5 adjacent thereto are both turned on in the light-emitting chip C.

Then, the light-emission signal φI is switched from the high level to the low level in the state where the transfer thyristors T4 and T5 are both turned on ((q) in FIG. 16). In response, the even-numbered light-emitting thyristor L4 and the odd-numbered light-emitting thyristor L5 adjacent thereto are both turned on to start emitting light.

After that, the first transfer signal φ1 is switched from the low level to the high level in the state where the transfer thyristors T4 and T5 are both turned on and the light-emitting thyristors L4 and L5 are both turned on, that is, the light-emitting thyristors L4 and L5 emit light ((r) in FIG. 16). In response, the transfer thyristor T5 transitions from on to off while the transfer thyristor T4 is kept turned on. However, because of the inherent properties of a thyristor, once turned on, the light-emitting thyristor L5 does not get turned off but continues to emit light even if the transfer thyristor T5 gets turned off. Accordingly, still at this time point (r), the light-emitting thyristors L4 and L5 both continue to emit light.

Then, the first transfer signal φ1 is switched from the high level to the low level again in the state where the transfer thyristor T4 is kept turned on, the transfer thyristor T5 is turned off and the light-emitting thyristors L4 and L5 are both turned on, that is, the light-emitting thyristors L4 and L5 emit light ((s) in FIG. 16). In response, among the odd-numbered transfer thyristors T1, T3, ..., T259 that are supplied with the first transfer signal φ1 of low level, the transfer thyristor T5, whose gate terminal is connected to that of the light-emitting thyristor L5 currently emitting light, gets turned on again. At this time, the even-numbered transfer thyristor T4 and the odd-numbered transfer thyristor T5 adjacent thereto are both turned on in the light-emitting chip C. Still at this time point (s), the light-emitting thyristors L4 and L5 both continue to emit light.

After that, the second transfer signal φ2 is switched from the low level to the high level in the state where the transfer thyristors T4 and T5 are both turned on and the light-emitting thyristors L4 and L5 are both turned on, that is, the light-emitting thyristors L4 and L5 emit light ((t) in FIG. 16). In response, the transfer thyristor T4 transitions from the on state to the off state while the transfer thyristor T5 is kept turned on. However, because of the inherent properties of a thyristor, once turned on, the light-emitting thyristor L4 does not get turned off but continues to emit light even if the transfer thyristor T4 gets turned off. Accordingly, still at this time point (t), the light-emitting thyristors L4 and L5 both continue to emit light.

Then, the second transfer signal φ2 is switched from the high level to the low level again in the state where the transfer thyristor T5 is kept turned on, the transfer thyristor T4 is turned off and the light-emitting thyristors L4 and L5 are both turned on, that is, the light-emitting thyristors L4 and L5 emit light ((u) in FIG. 16). In response, among the even-numbered transfer thyristors T2, T4, ..., T260 that are supplied with the second transfer signal φ2 of low level, the transfer thyristor T4, whose gate terminal is connected to that of the light-emitting thyristor L4 currently emitting light, gets turned on again. At this time, the even-numbered transfer thyristor T4 and the odd-numbered transfer thyristor T5 adjacent thereto are both turned on in the light-emitting chip C. Still at this time point (u), the light-emitting thyristors L4 and L5 both continue to emit light.

After that, the second transfer signal φ2 is switched from the low level to the high level again in the state where the transfer thyristors T4 and T5 are both turned on and the light-emitting thyristors L4 and L5 are both turned on, that is, the light-emitting thyristors L4 and L5 emit light ((v) in FIG. 16). In response, the transfer thyristor T4 transitions from on state to the off state while the transfer thyristor T5 is kept turned on. However, because of the inherent properties of a thyristor, once turned on, the light-emitting thyristor L4 does not get turned off but continues to emit light even if the transfer thyristor T4 gets turned off. Accordingly, still at this time point (v), the light-emitting thyristors L4 and L5 both continue to emit light.

Then, the light-emission signal φI is switched from the low level to the high level in the state where the transfer thyristor T5 is kept turned on, the transfer thyristor T4 is turned off and the light-emitting thyristors L4 and L5 are both turned on, that is, the light-emitting thyristors L4 and L5 both emit light ((w) in FIG. 16). In response, the light-emitting thyristors L4 and L5 both stop emitting light, and thus emit no light after that.

Subsequently, the second transfer signal φ2 is switched from the high level to the low level in the state where the transfer thyristor T5 is kept turned on, the transfer thyristor T4 is kept turned off and the light-emitting thyristors L4 and L5 both stop emitting light ((x) in FIG. 16). In response, among the even-numbered transfer thyristors T2, T4, ..., T260 that are supplied with the second transfer signal φ2 of low level, the transfer thyristor T6, which has the highest gate voltage not lower than the threshold voltage, gets turned on. Note that the gate voltage of the transfer thyristor T4, which is upstream from the transfer thyristor T6, has dropped in response to stop of light emission of the light-emitting thyristor L4 whose gate terminal is connected to that of the transfer thyristor T4, and thus is lower than that of the transfer thyristor T6 at this time point (x). At this time, the odd-numbered transfer thyristor T5 and the even-numbered transfer thyristor T6 adjacent thereto are both turned on in the light-emitting chip C.

However, in the even-odd mode, an even-numbered light-emitting thyristor and an odd-numbered light-emitting thyristor next thereto are used as a pair to emit light at a time. Accordingly, the light-emission signal φI is never switched from the high level to the low level in this state.

Then, the first transfer signal φ1 is switched from the low level to the high level in the state where the transfer thyristors T5 and T6 are both turned on ((y) in FIG. 16). In response, the transfer thyristor T5 transitions from the on state to the off state while the transfer thyristor T6 is kept turned on.

Then, the first transfer signal φ1 is switched from the high level to the low level in the state where the transfer thyristor T6 is turned on ((z) in FIG. 16). In response, among the odd-numbered transfer thyristors T1, T3, . . . , T259 that are supplied with the first transfer signal φ1 of low level, the transfer thyristor T7, which has the highest gate voltage not lower than the threshold voltage, gets turned on. Note that the gate voltage of the transfer thyristor T5, which is upstream from the transfer thyristor T7, has dropped in response to stop of light emission of the light-emitting thyristor L5 whose gate terminal is connected to that of the transfer thyristor T5, and thus is lower than that of the transfer thyristor T7 at this time point (z). At this time, the even-numbered transfer thyristor T6 and the odd-numbered transfer thyristor T7 adjacent thereto are both turned on in the light-emitting chip C.

Note that, in this example, the period from (f) to (h) and period from (p) to (r) in FIG. 16 are each equivalent to the seventh period Tg in FIG. 12. Meanwhile, the period from (l) to (n) and period from (v) to (x) in FIG. 16 are each equivalent to the fourth period Td in FIG. 12.

The same procedure is followed for the operations of the subsequent light-emitting thyristors. Specifically, the light-emission signal φI is switched from the high level to the low level in the seventh period Tg and in the state where an even-numbered transfer thyristor and an odd-numbered transfer thyristor downstream therefrom and adjacent thereto are both turned on. This causes an even-numbered light-emitting thyristor and an odd-numbered light-emitting thyristor downstream therefrom and adjacent thereto, whose gate terminals are respectively connected to those of the even-numbered transfer thyristor and the odd-numbered transfer thyristor, to both emit light. In addition, the light-emission signal φI is switched from the low level to the high level in the fourth period Td and in the state where only the odd-numbered transfer thyristor is turned on. This causes the even-numbered light-emitting thyristor and the odd-numbered light-emitting thyristor downstream therefrom and adjacent thereto to both stop emitting light. In this fourth period Td, only the odd-numbered transfer thyristor, which is downstream from the paired even-numbered transfer thyristor, is turned on, so that an even-numbered transfer thyristor next to this odd-numbered transfer thyristor is to be turned on next. In this way, normal transfer is maintained.

(Even-odd Alternate Light-emitting Operation)

Lastly, with reference to FIG. 6 and the timing chart shown in FIG. 17, the even-odd alternate light-emitting operation will be described.

Here, the process from (a) to (p) in FIG. 17 is exactly the same as that from (a) to (p) in FIG. 16 in the foregoing even-odd full light-emitting operation. Accordingly, the detailed description thereof will be omitted, and thus the even-odd alternate light-emitting operation will be described from (p) in FIG. 17.

In the state where the transfer thyristor T4 is turned on after a series of the time points (a) to (o) in FIG. 17, the first transfer signal φ1 is switched from the high level to the low level ((p) in FIG. 17). In response, among the odd-numbered transfer thyristors T1, T3, . . . , T259 that are supplied with the first transfer signal φ1 of low level, the transfer thyristor T5, which has the highest gate voltage not lower than the threshold voltage, gets turned on. Note that the gate voltage of the transfer thyristor T3, which is upstream from the transfer thyristor T5, has dropped in response to stop of light emission of the light-emitting thyristor L3 whose gate terminal is connected to that of the transfer thyristor T3, and thus is lower than that of the transfer thyristor T5 at this time point (p). At this time, the even-numbered transfer thyristor T4 and the odd-numbered transfer thyristor T5 adjacent thereto are both turned on in the light-emitting chip C.

However, in the even-odd alternate light-emitting operation, the light-emitting thyristors L4 and L5 are caused to emit no light. Accordingly, the light-emission signal φI is never switched from the high level to the low level in the state where the transfer thyristors T4 and T5 are both turned on.

After that, the first transfer signal φ1 is switched from the low level to the high level in the state where the transfer thyristors T4 and T5 are both turned on and the light-emitting thyristors L4 and L5 both emit no light ((q) in FIG. 17). In response, the transfer thyristor T5 transitions from the on state to the off state while the transfer thyristor T4 is kept turned on. Meanwhile, the light-emitting thyristors L4 and L5 both continue to emit no light.

Then, the first transfer signal φ1 is switched from the high level to the low level again in the state where the transfer thyristor T4 is kept turned on, the transfer thyristor T5 is turned off and the light-emitting thyristors L4 and L5 are both turned off, that is, the light-emitting thyristors L4 and L5 emit no light ((r) in FIG. 17). In response, among the odd-numbered transfer thyristors T1, T3, . . . , T259 that are supplied with the first transfer signal φ1 of low level, the transfer thyristor T5, which has the highest gate voltage not lower than the threshold voltage, gets turned on again. As a result, the even-numbered transfer thyristor T4 and the odd-numbered transfer thyristor T5 adjacent thereto are both turned on in the light-emitting chip C. Still at this time point (r), the light-emitting thyristors L4 and L5 both continue to emit no light.

After that, the second transfer signal φ2 is switched from the low level to the high level in the state where the transfer thyristors T4 and T5 are both turned on and the light-emitting thyristors L4 and L5 both emit no light ((s) in FIG. 17). In response, the transfer thyristor T4 transitions from the on state to the off state while the transfer thyristor T5 is kept turned on. Still at this time point (s), the light-emitting thyristors L4 and L5 both continue to emit no light.

Then, the second transfer signal φ2 is switched from the high level to the low level in the state where the transfer thyristor T5 is kept turned on, the transfer thyristor T4 is turned off and the light-emitting thyristors L4 and L5 both emit no light ((t) in FIG. 17). In response, among the even-numbered transfer thyristors T2, T4, . . . , T260 that are supplied with the second transfer signal φ2 of low level, the transfer thyristor T6, which has the highest gate voltage not lower than the threshold voltage, gets turned on. The reason why the transfer thyristor T6 gets turned on at this time point, unlike the example shown in FIG. 16, is as follows. At this time point (t), the light-emitting thyristor L4 emits no light, and thus the gate voltage of the transfer thyristor T4, whose gate terminal is connected to that of the light-emitting thyristor L4, is lower than that of the transfer thyristor T6. As a result, the odd-numbered transfer thyristor T5 and the even-numbered transfer thyristor T6 adjacent thereto are both turned on in the light-emitting chip C.

However, in the even-odd mode, an even-numbered light-emitting thyristor and an odd-numbered light-emitting thyristor next thereto are used as a pair to emit light at a time. Accordingly, the light-emission signal φI is never switched from the high level to the low level in this state.

Then, the second transfer signal φ2 is switched from the low level to the high level in the state where the transfer thyristors T5 and T6 are both turned on ((u) in FIG. 17). In response, the transfer thyristor T6 transitions from the on state to the off state while the transfer thyristor T5 is kept turned on.

Then, the second transfer signal φ2 is switched from the high level to the low level again in the state where the transfer thyristor T5 is kept turned on and the transfer thyristor T6 is turned off ((v) in FIG. 17). In response, among the even-numbered transfer thyristors T2, T4, . . . , T260 that are supplied with the second transfer signal φ2 of low level, the transfer thyristor T6, which has the highest gate voltage not lower than the threshold voltage, gets turned on again. At this time, the odd-numbered transfer thyristor T5 and the even-numbered transfer thyristor T6 adjacent thereto are both turned on in the light-emitting chip C.

Then, the first transfer signal φ1 is switched from the low level to the high level in the state where the transfer thyristors T5 and T6 are both turned on ((w) in FIG. 17). In response, the transfer thyristor T5 transitions from the on state to the off state while the transfer thyristor T6 is kept turned on.

Then, the first transfer signal φ1 is switched from the high level to the low level in the state where the transfer thyristor T6 is kept turned on and the transfer thyristor T5 is turned off ((x) in FIG. 17). In response, among the odd-numbered transfer thyristors T1, T3, . . . , T259 that are supplied with the first transfer signal φ1 of low level, the transfer thyristor T7, which has the highest gate voltage not lower than the threshold voltage, gets turned on. At this time, the even-numbered transfer thyristor T6 and the odd-numbered transfer thyristor T7 adjacent thereto are both turned on in the light-emitting chip C.

The same procedure is followed for the operations of the subsequent light-emitting thyristors. Specifically, the light-emission signal φI is switched from the high level to the low level in the seventh period Tg and in the state where an even-numbered transfer thyristor and an odd-numbered transfer thyristor downstream therefrom and adjacent thereto, which are assigned any pair of (2, 3), (6, 7), (10, 11), are both turned on. This causes an even-numbered (2, 6, 10, . . . ) light-emitting thyristor and an odd-numbered (3, 7, 11, . . . ) light-emitting thyristor downstream therefrom and adjacent thereto, whose gate terminals are respectively connected to those of the even-numbered (2, 6, 10, . . . ) transfer thyristor and the odd-numbered (3, 7, 11, . . . ) transfer thyristor, to both emit light. In addition, the light-emission signal φI is switched from the low level to the high level in the fourth period Td and in the state where only the odd-numbered (3, 7, 11, . . . ) transfer thyristor is turned on. This causes the even-numbered (2, 6, 10, . . . ) light-emitting thyristor and the odd-numbered (3, 7, 11, . . . ) light-emitting thyristor downstream therefrom and adjacent thereto to both stop emitting light. In this fourth period Td, only the odd-numbered transfer thyristor, which is down stream from the paired even-numbered transfer thyristor, is turned on, so that an even-numbered transfer thyristor downstream from and adjacent to this odd-numbered transfer thyristor is to be turned on next. In this way, normal transfer is maintained.

On the other hand, in this example, the light-emission signal φI is kept at the high level in the seventh period Tg and in the state where an even-numbered transfer thyristor and an odd-numbered transfer thyristor downstream therefrom and adjacent thereto, which are assigned any pair of (4, 5), (8, 9), . . . , are both turned on. This causes an even-numbered (2, 6, 10, . . . ) light-emitting thyristor and an odd-numbered (3, 7, 11, . . . ) light-emitting thyristor downstream therefrom and adjacent thereto, whose gate terminals are respectively connected to those of the even-numbered (2, 6, 10, . . . ) transfer thyristor and the odd-numbered (3, 7, 11, . . . ) transfer thyristor, to both emit no light. However, in this case as well, in the fourth period Td, only the odd-numbered transfer thyristor, which is downstream from the paired even-numbered transfer thyristor, is turned on, so that an even-numbered transfer thyristor downstream from and adjacent to this odd-numbered transfer thyristor is to be turned on next. In this way, normal transfer is maintained.

As described above, in each of the odd-even mode and the even-odd mode, the exposure operation is performed by using two adjacent light-emitting thyristors as a pair and by setting each pair of the light-emitting thyristors to emit light or not. This allows a positional shift of each LPH 14 in the first scan direction to be corrected on a 0.5 pixel of image data basis.

Specifically, in the present exemplary embodiment, a positional shift of each LPH 14 in the first scan direction is corrected on a single light-emitting thyristor basis, that is, on a 0.5 pixel of image data basis, by supplying the first and second transfer signals φ1 and φ2 whose waveforms are fixed and thus unchanged, regardless of whether in the odd-even mode or in the even-odd mode, and by changing the supply timing of the light-emission signal φI (timing of switching the light-emission signal φI from the high level to the low level, in the present exemplary embodiment) according to whether in the odd-even mode or in the even-odd mode.

In the present exemplary embodiment, each LPH 14 is constituted by multiple light-emitting thyristors arranged in the first scan direction. Here, the amount of luminous output varies between the light-emitting thyristors. Accordingly, if not corrected, such luminous amount variation might cause density irregularity in an image to be formed with the LPH 14.

In a known method for correcting such luminous amount variation, the length of the light-emitting period of each light-emitting thyristor is adjusted. In the present exemplary embodiment, the light-emission signal generating unit 110 provided in the signal generating circuit 100 (see FIG. 5) is capable of adjusting the length of the light-emitting period of each pair of light-emitting thyristors within the length of any one of the fourth and eighth periods Td and Th. Here, the fourth and eighth periods Td and Th are provided as periods in any of which a pair of light-emitting thyristors currently emitting light is allowed to stop emitting light. Moreover, in the present exemplary embodiment, the fourth and eighth periods Td and Th are set to be longer than the second and sixth periods Tb and Tf, respectively. This increases an adjustable range of the light-emitting period length, and thus increases capability of luminous amount correction, as compared to, for example, the case where the fourth and eighth periods Td and Th are set as long as the second and sixth periods Tb and Tf, respectively.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light-emitting device, comprising:
a plurality of light-emitting elements that are arrayed in a line at intervals corresponding to a first resolution;
a plurality of switch elements that are electrically connected respectively to the plurality of light-emitting elements, and that each set one of the light-emitting elements which is connected thereto to be more ready to emit light when each of the switch elements is set to be in an on state as compared to when each of the switch elements is set to be in an off state;
a transfer signal supply unit that supplies a transfer signal for transmitting an on state among the plurality of switch elements by alternately repeating an operation of turning on one switch element in the plurality of switch elements, and an operation of turning on two adjacent switch elements in the plurality of switch elements, the two adjacent switch elements including the one switch element; and
a light-emission signal supply unit that supplies a light-emission signal corresponding to a second resolution being a half of the first resolution, at supply timing changed according to whether in a first mode or in a second mode, the first mode being a mode in which an odd-numbered light-emitting element and an even-numbered light-emitting element downstream from and adjacent to the odd-numbered light-emitting element are caused to emit light as a pair, the second mode being a mode in which an even-numbered light-emitting element and an odd-numbered light-emitting element downstream from and adjacent to the even-numbered light-emitting element are caused to emit light as a pair, each odd-numbered light-emitting element being one of the light-emitting elements arrayed at a position corresponding to an odd-number thereof, each even-numbered light-emitting element being one of the light-emitting elements arrayed at a position corresponding to an even-number thereof.

2. The light-emitting device according to claim 1, wherein the transfer signal supply unit supplies the transfer signal repeating a sequence of a first period to an eighth period as a cycle,
the first period being a period during which an odd-numbered switch element and an even-numbered switch element are both turned on,
the second period being a period during which the odd-numbered switch element is turned on, and which the even-numbered switch element is turned off,
the third period being a period during which the odd-numbered switch element and an even-numbered one of the switch elements are both turned on,
the fourth period being a period during which the odd-numbered switch element is turned on, and which the even-numbered one of the switch elements is turned off,
the fifth period being a period during which the odd-numbered switch element and an even-numbered one of the switch elements are both turned on,
the sixth period being a period during which the odd-numbered switch element is turned off, and which the even-numbered one of the switch elements is turned on,
the seventh period being a period during which an odd-numbered one of the switch elements and the even-numbered one of the switch elements are both turned on,
the eighth period being a period during which the odd-numbered one of the switch elements is turned off, and which the even-numbered one of the switch elements is turned on,
the light-emission signal supply unit sets, in the first mode, the supply timing of the light-emission signal for starting light emission in the third period, and sets, in the second mode, the supply timing of the light-emission signal for starting light emission in the seventh period.

3. The light-emitting device according to claim 2, wherein the light-emission signal supply unit sets, in the first mode, the supply timing of the light-emission signal for stopping light emission in the eighth period, and sets, in the second mode, the supply timing of the light-emission signal for stopping light emission in the fourth period.

4. The light-emitting device according to claim 3, wherein the eighth period is set to be longer than the third period, and the fourth period is set to be longer than the seventh period.

5. The light-emitting device according to claim 3, wherein the eighth period is set to be longer than the sixth period, and the fourth period is set to be longer than the second period.

6. An exposure device, comprising:
a plurality of light-emitting element chips each including:
a substrate;
a light-emitting element array having a plurality of light-emitting elements arrayed on the substrate in a line in a first scan direction at intervals corresponding to a first resolution, the light-emitting element array having:
a first light-emitting element group including light-emitting elements arrayed in a center portion in the first scan direction,
a second light-emitting element group including light-emitting elements arrayed on a side of one end of the first light-emitting element group in the first scan direction, and
a third light-emitting element group including light-emitting elements arrayed on a side of the other end of the first light-emitting element group in the first scan direction; and
a plurality of switch elements that are provided on the substrate, that are electrically connected respectively to the plurality of light-emitting elements, and that each set one of the light-emitting elements connected thereto to be more ready to emit light when each of the switch elements is turned on as compared to when each of the switch elements is turned off;
a mounting member on which the plurality of light-emitting element chips are mounted in a zigzag pattern to form an overlapping portion in a borderline region between each adjacent two light-emitting chips of the plurality of light-emitting chips, the overlapping portion including the second light-emitting element group of one of the adjacent two light-emitting chips and the third light-emitting element group of the other one of the adjacent two light-emitting chips overlapping with each other in the first scan direction;

a light-emission signal supply section that supplies the plurality of light-emitting element chips with respective light-emission signals corresponding to a second resolution being a half of the first resolution;

a transfer signal supply section that supplies a transfer signal in common to the plurality of light-emitting element chips; and an optical member that focuses light emitted by the plurality of light-emitting element chips onto an image carrier, the light-emission signal supply section supplying the plurality of light-emitting element chips with the respective light-emission signals in each of which, according to whether in a first mode or in a second mode, positions of the light-emitting elements set as luminous targets are corrected so as to be consecutive in the first scan direction in each overlapping portion, the first mode being a mode in which an odd-numbered light-emitting element and an even-numbered light-emitting element downstream from and adjacent to the odd-numbered light-emitting element are caused to emit light as a pair, the second mode being a mode in which an even-numbered light-emitting element and an odd-numbered light-emitting element downstream from and adjacent to the even-numbered light-emitting element are caused to emit light as a pair, each odd-numbered light-emitting element being one of the light-emitting elements arrayed at a position corresponding to an odd-number thereof, each even-numbered light-emitting element being one of the light-emitting elements arrayed at a position corresponding to an even-number thereof, the transfer signal supply section supplying the plurality of switch elements with the transfer signal for transmitting an on state among the switch elements in each of the light-emitting element chips, by alternately repeating an operation of turning on one switch element in the plurality of switch elements, and an operation of turning on two adjacent switch elements in the plurality of switch elements, the two adjacent switch elements including the one switch element, and the light-emission signal supply section supplying the light-emission signals at supply timing changed according to whether in the first mode or in the second mode.

7. The exposure device according to claim 6, wherein the transfer signal supply section supplies the transfer signal repeating a sequence of a first period to an eighth period as a cycle,
the first period being a period during which an odd-numbered switch element and an even-numbered switch element are both turned on,
the second period being a period during which the odd-numbered switch element is turned on, and which the even-numbered switch element is turned off,
the third period being a period during which the odd-numbered switch element and an even-numbered one of the switch elements are both turned on,
the fourth period being a period during which the odd-numbered switch element is turned on, and which the even-numbered one of the switch elements is turned off,
the fifth period being a period during which the odd-numbered switch element and an even-numbered one of the switch elements are both turned on,
the sixth period being a period during which the odd-numbered switch element is turned off, and which the even-numbered one of the switch elements is turned on,
the seventh period being a period during which an odd-numbered one of the switch elements and the even-numbered one of the switch element are both turned on,
the eighth period being a period during which the odd-numbered one of the switch elements is turned off, and which the even-numbered one of the switch elements is turned on, and
the light-emission signal supply section sets, in the first mode, the supply timing of the light-emission signals for starting light emission in the third period, and sets, in the second mode, the supply timing of the light-emission signals for starting light emission in the seventh period.

8. The exposure device according to claim 6, wherein the light-emission signal supply section supplies the plurality of light-emitting element chips with the respective light-emission signals in each of which the same number of pairs of light-emitting elements are set as luminous targets.

9. An image forming apparatus, comprising a plurality of image forming parts each including:
an image carrier;
a charging device that charges the image carrier;
an exposure device that exposes the image carrier charged by the charging device to form an electrostatic latent image on the image carrier, the exposure device including:
a plurality of light-emitting elements arrayed in a line at intervals corresponding to a first resolution;
a plurality of switch elements electrically connected respectively to the plurality of light-emitting elements, and each setting one of the light-emitting elements connected thereto to be more ready to emit light when each of the switch elements is turned on as compared to when each of the switch elements is turned off;
a transfer signal supply unit that supplies the plurality of switch elements with a transfer signal for transmitting an on state among the plurality of switch elements by alternately repeating an operation of turning on one switch element in the plurality of switch elements, and an operation of turning on two adjacent switch elements in the plurality of switch elements, the two adjacent switch elements including the one switch element;
a light-emission signal supply unit that supplies the plurality of light-emitting elements with a light-emission signal corresponding to a second resolution being a half of the first resolution; and
a change unit that changes supply timing at which the light-emission signal supply unit supplies the light-emission signal according to whether in a first mode or in a second mode, the first mode being a mode in which an odd-numbered light-emitting element and an even-numbered light-emitting element downstream from and adjacent to the odd-numbered light-emitting element are caused to emit light as a pair, the second mode being a mode in which an even-numbered light-emitting element and an odd-numbered light-emitting element downstream from and adjacent to the even-numbered light-emitting element are caused to emit light as a pair, each odd-numbered light-emitting element being one of the light-emitting elements arrayed at a position corresponding to an odd number thereof, each even-numbered light-emitting element being one of the light-emitting elements arrayed at a position corresponding to an even number thereof;

a developing device that develops the electrostatic latent image formed on the image carrier to form an image; and a transfer device that transfers the image formed on the image carrier onto a recording medium.

10. A signal supply method to a light-emitting device having: a plurality of light-emitting elements that are arrayed in a line at intervals corresponding to a first resolution; a plurality of switch elements that are electrically connected respectively to the plurality of light-emitting elements, and that each set one of the light-emitting elements which is connected thereto to be more ready to emit light when each of the switch elements is set to be in an on state as compared to when each of the switch elements is set to be in an off state, the signal supply method comprising:

supplying a transfer signal for transmitting an on state among the plurality of switch elements by alternately repeating an operation of turning on one switch element in the plurality of switch elements, and an operation of turning on two adjacent switch elements in the plurality of switch elements, the two adjacent switch elements including the one switch element; and supplying a light-emission signal corresponding to a second resolution being a half of the first resolution, at supply timing changed according to whether in a first mode or in a second mode, the first mode being a mode in which an odd-numbered light-emitting element and an even-numbered light-emitting element downstream from and adjacent to the odd-numbered light-emitting element are caused to emit light as a pair, the second mode being a mode in which an even-numbered light-emitting element and an odd-numbered light-emitting element downstream from and adjacent to the even-numbered light-emitting element are caused to emit light as a pair, each odd-numbered light-emitting element being one of the light-emitting elements arrayed at a position corresponding to an odd-number thereof, each even-numbered light-emitting element being one of the light-emitting elements arrayed at a position corresponding to an even-number thereof.

* * * * *